United States Patent
Fan

(10) Patent No.: US 12,294,426 B2
(45) Date of Patent: May 6, 2025

(54) DATA TRANSMISSION METHOD AND APPARATUS

(71) Applicant: HUAWEI TECHNOLOGIES CO., LTD., Guangdong (CN)

(72) Inventor: Bo Fan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 357 days.

(21) Appl. No.: 17/899,311

(22) Filed: Aug. 30, 2022

(65) Prior Publication Data

US 2022/0416857 A1 Dec. 29, 2022

Related U.S. Application Data

(63) Continuation of application No. PCT/CN2020/078307, filed on Mar. 6, 2020.

(51) Int. Cl.
*H04B 7/0456* (2017.01)
*H04B 7/06* (2006.01)
*H04L 5/00* (2006.01)

(52) U.S. Cl.
CPC ......... *H04B 7/0456* (2013.01); *H04B 7/0617* (2013.01); *H04L 5/0051* (2013.01)

(58) Field of Classification Search
CPC ...... H04B 7/456; H04B 7/0617; H04L 5/0051

(Continued)

(56) References Cited

U.S. PATENT DOCUMENTS

2017/0366242 A1* 12/2017 Lee ................. H01Q 3/24
2018/0278315 A1 9/2018 Wu et al.
(Continued)

FOREIGN PATENT DOCUMENTS

CN 107615856 A 1/2018
CN 109075849 A 12/2018
(Continued)

OTHER PUBLICATIONS

Ericsson, Comparison of MAC CE signalling options for spatial relation update of aperiodic SRS. 3GPP TSG-RAN WG1 Meeting #97, Reno, USA, May 13, 17, 2019, R1-1907473, 5 pages.
(Continued)

*Primary Examiner* — Anthony Mejia

(57) ABSTRACT

Embodiments of this application provide a data transmission method and an apparatus, and relate to the communication field, to indicate a plurality of codebooks or a plurality of sounding reference signal (SRS) resource combinations. The method includes: A terminal device receives first information, where the first information is used to indicate a plurality of codebooks; and the terminal device performs data transmission based on the plurality of codebooks, where each of the plurality of codebooks corresponds to one beam. Alternatively, a terminal device is configured to receive second information, where the second information is used to indicate N SRS resource combinations, where N is an integer greater than 1; and the terminal device performs data transmission based on the N SRS resource combinations, where each of the N SRS resource combinations corresponds to one beam. Embodiments of this application are applied to a 5G communication system.

20 Claims, 6 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2019/0245608 | A1* | 8/2019 | Kakishima | ............ H04W 88/02 |
| 2020/0119785 | A1* | 4/2020 | Varatharaajan | ...... H04B 7/0617 |
| 2021/0273692 | A1* | 9/2021 | Gao | ..................... H04B 17/309 |
| 2022/0416861 | A1* | 12/2022 | Manolakos | ........... H04L 1/0029 |

FOREIGN PATENT DOCUMENTS

| | | |
|---|---|---|
| CN | 110858775 A | 3/2020 |
| WO | 2018226581 A1 | 12/2018 |

OTHER PUBLICATIONS

3GPP TS 38.331 V15.8.0 (Dec. 2019), 3rd Generation Partnership Project; Technical Specification Group Radio Access Network; NR; Radio Resource Control (RRC) protocol specification(Release 15), 532 pages.

3GPP TS 38.211 V16.0.0 (Dec. 2019), 3rd Generation Partnership Project; Technical Specification Group Radio Access Network; NR; Physical channels and modulation(Release 16), 129 pages.

3GPP TS 38.212 V16.0.0 (Dec. 2019), 3rd Generation Partnership Project; Technical Specification Group Radio Access Network; NR; Multiplexing and channel coding(Release 16), 145 pages.

3GPP TS 38.213 V16.0.0 (Dec. 2019), 3rd Generation Partnership Project; Technical Specification Group Radio Access Network; NR; Physical layer procedures for control(Release 16), 146 pages.

3GPP TS 38.214 V16.0.0 (Dec. 2019), 3rd Generation Partnership Project; Technical Specification Group Radio Access Network; NR; Physical layer procedures for data(Release 16), 147 pages.

ZTE, ZTE Microelectronics, Codebook based UL transmission. 3GPP TSG RAN WG1 Meeting #88, Athens, Greece, Feb. 13-17, 2017, R1-1701792, 3 pages.

* cited by examiner

DATA TRANSMISSION METHOD AND APPARATUS

CROSS-REFERENCE TO RELATED APPLICATIONS

This application is a continuation of International Application No. PCT/CN2020/078307, filed on Mar. 6, 2020, the disclosure of which is hereby incorporated by reference in its entirety.

TECHNICAL FIELD

This application relates to the communication field, and in particular to a data transmission method and an apparatus.

BACKGROUND

A 5th generation (5G) mobile communication system can support two types of data transmission modes, including codebook based data transmission and non-codebook based data transmission. For example, steps of the codebook based data transmission are as follows: Step S01: A network device configures, for a terminal device by using radio resource control (RRC) signaling, a sounding reference signal (SRS) resource whose purpose/type (usage) is a codebook. Step S02: The terminal device sends an SRS resource whose usage is a codebook to the network device, and the network device measures the SRS resource, and selects, from preset codebooks in a protocol, an optimal codebook (where a codebook is a precoding matrix) used for physical uplink shared channel (PUSCH) transmission. Step S03: The network device notifies the terminal device of the optimal codebook by using downlink control information (DCI). Step S04: The terminal device performs PUSCH transmission by using the optimal codebook.

Steps of the non-codebook based data transmission are as follows: Step S11: A network device configures, for a terminal device by using RRC signaling, an SRS resource whose purpose/type is a non-codebook and a channel state information reference signal (CSI-RS) resource associated with the SRS resource. Step S12: The terminal device measures the CSI-RS resource, determines downlink channel information, infers uplink channel information based on uplink and downlink channel reciprocity, and calculates K (K>1) codebooks with better performance. Step S13: For each of the K codebooks, the terminal device precodes a group of SRS resources (where a quantity of SRS resources in the group of SRS resources is equal to a quantity of layers of a corresponding codebook, that is, each SRS resource corresponds to one layer of the codebook and is used to simulate one spatial stream) based on the codebook, and sends the group of SRS resources to the network device. Step S14: The network device measures each group of SRS resources, and indicates an optimal group of SRS resources to the terminal device by using DCI. Step S15: The terminal device determines an optimal codebook based on the optimal group of SRS resources, and performs PUSCH transmission by using the codebook.

Currently, in the codebook based data transmission, DCI can indicate only one codebook; and in the non-codebook based data transmission, DCI can indicate only one group of SRS resources. Consequently, the terminal device cannot support multi-beam based data transmission.

SUMMARY

This application provides a data transmission method and an apparatus, to indicate a plurality of codebooks or a plurality of SRS resource combinations, where each codebook or each SRS resource combination corresponds to one beam, so that a terminal device can perform multi-beam based data transmission.

According to a first aspect, this application provides a data transmission method, including: A terminal device receives first information, where the first information is used to indicate a plurality of codebooks; and the terminal device performs data transmission based on the plurality of codebooks, where each of the plurality of codebooks corresponds to one beam.

In this application, the first information may indicate the plurality of codebooks, that is, a quantity of indicated codebooks is extended, so that the terminal device can perform multi-beam based data transmission based on the plurality of codebooks indicated by the first information.

In a possible implementation, the plurality of codebooks have a same quantity of layers. In this way, after a quantity of layers of one of the plurality of codebooks is determined, a quantity of layers of another codebook is determined accordingly, thereby reducing signaling overheads for indicating the plurality of codebooks.

In a possible implementation, the plurality of codebooks include a first codebook and a second codebook, the first codebook is determined from a first codebook set, the second codebook is determined from a second codebook set, and the second codebook set is a subset of the first codebook set. Optionally, the second codebook set may be a proper subset of the first codebook set. Therefore, a quantity of bits used to indicate the second codebook may be less than a quantity of bits used to indicate the first codebook, thereby reducing signaling overheads.

In a possible implementation, the first information is carried in a plurality of subfields of a first field, and each subfield is used to indicate one codebook.

In a possible implementation, the first field is a precoding information and number of layers (namely, precoding information and number of layers) field in downlink control information (DCI).

In a possible implementation, a codebook indicated by the $1^{st}$ subfield in the plurality of subfields is determined from the first codebook set based on a value of the $1^{st}$ subfield, and the first codebook set includes a plurality of codebooks.

In a possible implementation, a length of the $1^{st}$ subfield in the plurality of subfields is determined based on a quantity of codebooks included in the first codebook set.

In a possible implementation, the first codebook set is determined based on one or more of a quantity of antenna ports of the terminal device, a used waveform, an uplink full-power transmission mode, a codebook type, and a maximum quantity of spatial streams used for uplink transmission.

In a possible implementation, a codebook indicated by an $i^{th}$ subfield in the plurality of subfields is determined from the second codebook set based on a value of the $i^{th}$ subfield, and the second codebook set is a subset of the first codebook set, where i is an integer greater than or equal to 2.

In a possible implementation, a length of the $i^{th}$ subfield is determined based on a quantity of codebooks included in the second codebook set.

In a possible implementation, the second codebook set includes a codebook whose quantity of codebook layers is Q in the first codebook set, where Q is a quantity of layers of the codebook indicated by the $1^{st}$ subfield in the plurality of subfields, and Q is an integer greater than or equal to 1.

In a possible implementation, the first information is carried in a plurality of fields, and each field is used to indicate one codebook.

In a possible implementation, the first information is carried in a first field, the first field is used to indicate a codebook whose quantity of layers is a, and the codebook whose quantity of layers is a is used to determine M codebooks whose quantities of layers each are b, where a is an integer greater than or equal to 2, M is an integer greater than or equal to 2, b is an integer greater than or equal to 1, and a=M*b.

In a possible implementation, the first information is carried in a first field, the first field is used to indicate one codebook set, and the codebook set includes one or more codebooks.

In a possible implementation, Z bits in the DCI indicate one or both of the following information, where Z is a positive integer: a quantity of codebooks indicated by the first field; and information indicating whether the quantity of codebooks indicated by the first field is greater than 1.

In a possible implementation, the Z bits are the first Z bits in the first field.

In a possible implementation, when a condition 1 is met, the first information is used to indicate the plurality of codebooks, and the condition 1 includes one or more of the following: a network device indicates the terminal device to perform multi-beam or multi-sounding reference signal (SRS) resource based physical uplink shared channel (PUSCH) transmission; the network device indicates the terminal device to perform PUSCH transmission by using the plurality of codebooks; and the network device indicates, to the terminal device, a plurality of beams or SRS resources used for PUSCH transmission.

According to a second aspect, this application provides a data transmission method, including: A terminal device receives second information, where the second information is used to indicate N sounding reference signal (SRS) resource combinations, where N is an integer greater than 1; and the terminal device performs data transmission based on the N SRS resource combinations, where each of the N SRS resource combinations corresponds to one beam.

In this application, the second information indicates a plurality of SRS resource combinations to the terminal device, that is, a quantity of indicated SRS resource combinations is extended, so that the terminal device can perform multi-beam based uplink transmission based on the plurality of SRS resource combinations indicated by the second information.

In a possible implementation, each of the N SRS resource combinations has an equal quantity of SRS resources. In this way, the terminal device may determine, based on a quantity of SRS resources in one of the SRS resource combinations, a quantity of SRS resources in a remaining SRS resource combination, thereby reducing signaling overheads for indicating the quantity of SRS resources in the remaining SRS resource combination.

In a possible implementation, the N SRS resource combinations include a first SRS resource combination and a second SRS resource combination, the first SRS resource combination is determined from a first set, the second SRS resource combination is determined from a second set, and the second set is a subset of the first set. Optionally, the second set may be a proper subset of the first set. In this way, a quantity of bits used to indicate the first SRS resource combination may be less than a quantity of bits used to indicate the second SRS resource combination, thereby reducing signaling consumption.

In a possible implementation, that the terminal device performs data transmission based on the N SRS resource combinations includes: The terminal device performs repeated transmission of uplink data based on the N SRS resource combinations.

In a possible implementation, the second information is carried in a second field, the second field includes a plurality of subfields, and each subfield is used to indicate one SRS resource combination.

In a possible implementation, the second field is a sounding reference signal resource indicator (SRI) field in downlink control information (DCI).

In a possible implementation, an SRS resource combination indicated by the $1^{st}$ subfield in the plurality of subfields is determined from the first set based on a value of the $1^{st}$ subfield, and the first set includes a plurality of SRS resource combinations.

In a possible implementation, a length of the $1^{st}$ subfield in the plurality of subfields is determined based on a quantity of SRS resource combinations included in the first set.

In a possible implementation, the first set is determined based on a maximum quantity of spatial streams for uplink transmission and/or an SRS resource corresponding to the $1^{st}$ subfield, and the SRS resource corresponding to the $1^{st}$ subfield includes any one of the following: a configured or activated SRS resource set used for non-codebook based uplink transmission; an SRS resource set that corresponds to the $1^{st}$ subfield and that is used for non-codebook based uplink transmission; and an SRS resource subset corresponding to the $1^{st}$ subfield in the configured or activated SRS resource set used for non-codebook based uplink transmission.

In a possible implementation, an SRS resource combination indicated by $j^{th}$ subfield in the plurality of subfields is determined from the second set based on a value of the $j^{th}$ subfield, and the second set is a subset of the first set, where j is an integer greater than or equal to 2.

In a possible implementation, a length of the $j^{th}$ subfield is determined based on a quantity of SRS resource combinations included in the second set.

In a possible implementation, the second set includes an SRS resource combination that is in the first set and whose quantity of SRS resources is P, where P is a quantity of SRS resources included in the SRS resource combination indicated by the $1^{st}$ subfield, P is an integer greater than or equal to 1, and j is an integer greater than or equal to 2.

In a possible implementation, the second information is carried in a plurality of fields, and each field is used to determine one SRS resource combination.

In a possible implementation, the second information is carried in a second field, and the second field is used to indicate the N SRS resource combinations.

In a possible implementation, the N SRS resource combinations meet one or more of the following constraints: constraint 1: a quantity of SRS resources included in each of the N SRS resource combinations is less than or equal to a first preset threshold; constraint 2: a total quantity of SRS resources included in the N SRS resource combinations is less than or equal to a second preset threshold; constraint 3: each of the N SRS resource combinations corresponds to one SRS resource set or one SRS resource subset, and the SRS resource combinations correspond to different SRS resource sets or SRS resource subsets; and constraint 4: each of the N SRS resource combinations includes an equal quantity of SRS resources.

In a possible implementation, when a condition 2 is met, the second information is used to indicate the N sounding reference signal (SRS) resource combinations, and the condition 2 includes one or more of the following: a network device configures or activates a plurality of SRS resource sets used for non-codebook based uplink transmission; the network device configures or activates one SRS resource set used for non-codebook based uplink transmission, where the SRS resource set includes a plurality of SRS resource subsets; the network device configures or activates one SRS resource set used for non-codebook based uplink transmission, where the SRS resource set is associated with a plurality of CSI-RS resources; the network device indicates to perform physical uplink shared channel (PUSCH) transmission by using a plurality of SRS resource combinations; and the network device indicates that a PUSCH transmission mode is multi-beam based repeated PUSCH transmission.

In a possible implementation, Z bits in the DCI indicate one or more of the following information, where Z is a positive integer: a quantity of SRS resource combinations indicated by the DCI; information indicating whether the quantity of SRS resource combinations indicated by the DCI is greater than 1; information indicating whether the quantity of SRS resource combinations indicated by the DCI is equal to a quantity of configured SRS resource sets; and an SRS resource set corresponding to the SRS resource combination indicated by the DCI.

In a possible implementation, the Z bits are the first Z bits in the second field.

In a possible implementation, before that a terminal device receives second information, the method further includes: The terminal device receives configuration information, where the configuration information is used to configure one SRS resource set and one channel state information reference signal (CSI-RS) resource, the SRS resource set includes K SRS resource subsets, the CSI-RS resource includes K antenna port combinations, and the K SRS resource subsets are in one-to-one correspondence with the K antenna port combinations, where K is an integer greater than or equal to 1; or the configuration information is used to configure one SRS resource set and K CSI-RS resources, the SRS resource set includes K SRS resource subsets, and the K SRS resource subsets are in one-to-one correspondence with the K CSI-RS resources; or the configuration information is used to configure K SRS resource sets and one CSI-RS resource, the one CSI-RS resource includes K antenna ports, and the K antenna ports are in one-to-one correspondence with the K SRS resource sets; or the configuration information is used to configure K SRS resource sets and K CSI-RS resources, and the K CSI-RS resources are in one-to-one correspondence with the K SRS resource sets.

According to a third aspect, this application provides a data transmission method, including: A network device sends first information, where the first information is used to indicate a plurality of codebooks; and the network device performs data transmission based on the plurality of codebooks, where each of the plurality of codebooks corresponds to one beam.

In a possible implementation, the plurality of codebooks have a same quantity of layers.

In a possible implementation, the plurality of codebooks include a first codebook and a second codebook, the first codebook is determined from a first codebook set, the second codebook is determined from a second codebook set, and the second codebook set is a subset of the first codebook set.

In a possible implementation, the first information is carried in a plurality of subfields of a first field, and each subfield is used to indicate one codebook.

In a possible implementation, the first field is a precoding information and number of layers field in downlink control information (DCI).

In a possible implementation, a codebook indicated by the $1^{st}$ subfield in the plurality of subfields is determined from the first codebook set based on a value of the $1^{st}$ subfield, and the first codebook set includes a plurality of codebooks.

In a possible implementation, a length of the $1^{st}$ subfield in the plurality of subfields is determined based on a quantity of codebooks included in the first codebook set.

In a possible implementation, the first codebook set is determined based on one or more of a quantity of antenna ports of a terminal device, a used waveform, an uplink full-power transmission mode, a codebook type, and a maximum quantity of spatial streams used for uplink transmission.

In a possible implementation, a codebook indicated by an $i^{th}$ subfield in the plurality of subfields is determined from the second codebook set based on a value of the $i^{th}$ subfield, and the second codebook set is a subset of the first codebook set, where i is an integer greater than or equal to 2.

In a possible implementation, a length of the $i^{th}$ subfield is determined based on a quantity of codebooks included in the second codebook set.

In a possible implementation, the second codebook set includes a codebook whose quantity of codebook layers is Q in the first codebook set, where Q is a quantity of layers of the codebook indicated by the $1^{st}$ subfield in the plurality of subfields, and Q is an integer greater than or equal to 1.

In a possible implementation, the first information is carried in a plurality of fields, and each field is used to indicate one codebook.

In a possible implementation, the first information is carried in a first field, the first field is used to indicate a codebook whose quantity of layers is a, and the codebook whose quantity of layers is a is used to determine M codebooks whose quantities of layers each are b, where a is an integer greater than or equal to 2, M is an integer greater than or equal to 2, b is an integer greater than or equal to 1, and a=M*b.

In a possible implementation, the first information is carried in a first field, the first field is used to indicate one codebook set, and the codebook set includes one or more codebooks.

In a possible implementation, Z bits in the DCI indicate one or both of the following information, where Z is a positive integer: a quantity of codebooks indicated by the first field; and information indicating whether the quantity of codebooks indicated by the first field is greater than 1.

In a possible implementation, the Z bits are the first Z bits in the first field.

In a possible implementation, when a condition 1 is met, the first information is used to indicate the plurality of codebooks, and the condition 1 includes one or more of the following: the network device indicates the terminal device to perform multi-beam or multi-sounding reference signal (SRS) resource based physical uplink shared channel (PUSCH) transmission; the network device indicates the terminal device to perform PUSCH transmission by using the plurality of codebooks; and the network device indicates, to the terminal device, a plurality of beams or SRS resources used for PUSCH transmission.

According to a fourth aspect, this application provides a data transmission method, including: A network device sends second information, where the second information is used to indicate N sounding reference signal (SRS) resource combinations, where N is an integer greater than 1; and the network device performs data transmission based on the N SRS resource combinations, where each of the N SRS resource combinations corresponds to one beam.

In a possible implementation, each of the N SRS resource combinations has an equal quantity of SRS resources.

In a possible implementation, the N SRS resource combinations include a first SRS resource combination and a second SRS resource combination, the first SRS resource combination is determined from a first set, the second SRS resource combination is determined from a second set, and the second set is a subset of the first set.

In a possible implementation, that the network device performs data transmission based on the N SRS resource combinations includes: The network device performs repeated transmission based on the N SRS resource combinations.

In a possible implementation, the second information is carried in a second field, the second field includes a plurality of subfields, and each subfield is used to indicate one SRS resource combination.

In a possible implementation, the second field is a sounding reference signal resource indicator (SRI) field in downlink control information (DCI).

In a possible implementation, an SRS resource combination indicated by the $1^{st}$ subfield in the plurality of subfields is determined from the first set based on a value of the $1^{st}$ subfield, and the first set includes a plurality of SRS resource combinations.

In a possible implementation, a length of the $1^{st}$ subfield in the plurality of subfields is determined based on a quantity of SRS resource combinations included in the first set.

In a possible implementation, the first set is determined based on a maximum quantity of spatial streams for uplink transmission and/or an SRS resource corresponding to the $1^{st}$ subfield, and the SRS resource corresponding to the $1^{st}$ subfield includes any one of the following: a configured or activated SRS resource set used for non-codebook based uplink transmission; an SRS resource set that corresponds to the $1^{st}$ subfield and that is used for non-codebook based uplink transmission; and an SRS resource subset corresponding to the $1^{st}$ subfield in the configured or activated SRS resource set used for non-codebook based uplink transmission.

In a possible implementation, an SRS resource combination indicated by $j^{th}$ subfield in the plurality of subfields is determined from the second set based on a value of the $j^{th}$ subfield, and the second set is a subset of the first set, where j is an integer greater than or equal to 2.

In a possible implementation, a length of the $j^{th}$ subfield is determined based on a quantity of SRS resource combinations included in the second set.

In a possible implementation, the second set includes an SRS resource combination that is in the first set and whose quantity of SRS resources is P, where P is a quantity of SRS resources included in the SRS resource combination indicated by the $1^{st}$ subfield, P is an integer greater than or equal to 1, and j is an integer greater than or equal to 2.

In a possible implementation, the second information is carried in a plurality of fields, and each field is used to determine one SRS resource combination.

In a possible implementation, the second information is carried in a second field, and the second field is used to indicate the N SRS resource combinations.

In a possible implementation, the N SRS resource combinations meet one or more of the following constraints: constraint 1: a quantity of SRS resources included in each of the N SRS resource combinations is less than or equal to a first preset threshold; constraint 2: a total quantity of SRS resources included in the N SRS resource combinations is less than or equal to a second preset threshold; constraint 3: each of the N SRS resource combinations corresponds to one SRS resource set or one SRS resource subset, and the SRS resource combinations correspond to different SRS resource sets or SRS resource subsets; and constraint 4: each of the N SRS resource combinations includes an equal quantity of SRS resources.

In a possible implementation, when a condition 2 is met, the second information is used to indicate the N sounding reference signal (SRS) resource combinations, and the condition 2 includes one or more of the following: the network device configures or activates a plurality of SRS resource sets used for non-codebook based uplink transmission; the network device configures or activates one SRS resource set used for non-codebook based uplink transmission, where the SRS resource set includes a plurality of SRS resource subsets; the network device configures or activates one SRS resource set used for non-codebook based uplink transmission, where the SRS resource set is associated with a plurality of CSI-RS resources; the network device indicates to perform physical uplink shared channel (PUSCH) transmission by using a plurality of SRS resource combinations; or the network device indicates that a PUSCH transmission mode is multi-beam based repeated PUSCH transmission.

In a possible implementation, Z bits in the DCI indicate one or more of the following information, where Z is a positive integer: a quantity of SRS resource combinations indicated by the DCI; information indicating whether the quantity of SRS resource combinations indicated by the DCI is greater than 1; information indicating whether the quantity of SRS resource combinations indicated by the DCI is equal to a quantity of configured SRS resource sets; and an SRS resource set corresponding to the SRS resource combination indicated by the DCI.

In a possible implementation, the Z bits are the first Z bits in the second field.

In a possible implementation, before that a network device sends second information, the method further includes: The network device sends configuration information, where the configuration information is used to configure one SRS resource set and one channel state information reference signal (CSI-RS) resource, the SRS resource set includes K SRS resource subsets, the CSI-RS resource includes K antenna port combinations, and the K SRS resource subsets are in one-to-one correspondence with the K antenna port combinations, where K is an integer greater than or equal to 1; or the configuration information is used to configure one SRS resource set and K CSI-RS resources, the SRS resource set includes K SRS resource subsets, and the K SRS resource subsets are in one-to-one correspondence with the K CSI-RS resources; or the configuration information is used to configure K SRS resource sets and one CSI-RS resource, the one CSI-RS resource includes K antenna ports, and the K antenna ports are in one-to-one correspondence with the K SRS resource sets; or the configuration information is used to configure K SRS resource sets and K CSI-RS resources, and the K CSI-RS resources are in one-to-one correspondence with the K SRS resource sets.

According to a fifth aspect, this application provides a communication apparatus. The communication apparatus may be a terminal device, and includes: a transceiver unit, configured to receive first information, where the first information is used to indicate a plurality of codebooks; and a processing unit, configured to perform data transmission based on the plurality of codebooks, where each of the plurality of codebooks corresponds to one beam.

In a possible implementation, the plurality of codebooks have a same quantity of layers.

In a possible implementation, the plurality of codebooks include a first codebook and a second codebook, the first codebook is determined from a first codebook set, the second codebook is determined from a second codebook set, and the second codebook set is a subset of the first codebook set.

In a possible implementation, the first information is carried in a plurality of subfields of a first field, and each subfield is used to indicate one codebook.

In a possible implementation, the first field is a precoding information and number of layers field in downlink control information (DCI).

In a possible implementation, a codebook indicated by the $1^{st}$ subfield in the plurality of subfields is determined from the first codebook set based on a value of the $1^{st}$ subfield, and the first codebook set includes a plurality of codebooks.

In a possible implementation, a length of the $1^{st}$ subfield in the plurality of subfields is determined based on a quantity of codebooks included in the first codebook set.

In a possible implementation, the first codebook set is determined based on one or more of a quantity of antenna ports of the terminal device, a used waveform, an uplink full-power transmission mode, a codebook type, and a maximum quantity of spatial streams used for uplink transmission.

In a possible implementation, a codebook indicated by an $i^{th}$ subfield in the plurality of subfields is determined from the second codebook set based on a value of the $i^{th}$ subfield, and the second codebook set is a subset of the first codebook set, where i is an integer greater than or equal to 2.

In a possible implementation, a length of the $i^{th}$ subfield is determined based on a quantity of codebooks included in the second codebook set.

In a possible implementation, the second codebook set includes a codebook whose quantity of codebook layers is Q in the first codebook set, where Q is a quantity of layers of the codebook indicated by the $1^{st}$ subfield in the plurality of subfields, and Q is an integer greater than or equal to 1.

In a possible implementation, the first information is carried in a plurality of fields, and each field is used to indicate one codebook.

In a possible implementation, the first information is carried in a first field, the first field is used to indicate a codebook whose quantity of layers is a, and the codebook whose quantity of layers is a is used to determine M codebooks whose quantities of layers each are b, where a is an integer greater than or equal to 2, M is an integer greater than or equal to 2, b is an integer greater than or equal to 1, and a=M*b.

In a possible implementation, the first information is carried in a first field, the first field is used to indicate one codebook set, and the codebook set includes one or more codebooks.

In a possible implementation, Z bits in the DCI indicate one or both of the following information, where Z is a positive integer: a quantity of codebooks indicated by the first field; and information indicating whether the quantity of codebooks indicated by the first field is greater than 1.

In a possible implementation, the Z bits are the first Z bits in the first field.

In a possible implementation, when a condition 1 is met, the first information is used to indicate the plurality of codebooks, and the condition 1 includes one or more of the following: a network device indicates the terminal device to perform multi-beam or multi-sounding reference signal (SRS) resource based physical uplink shared channel (PUSCH) transmission; the network device indicates the terminal device to perform PUSCH transmission by using the plurality of codebooks; and the network device indicates, to the terminal device, a plurality of beams or SRS resources used for PUSCH transmission.

According to a sixth aspect, this application provides a communication apparatus. The communication apparatus may be a terminal device, and includes: a transceiver unit, configured to receive second information, where the second information is used to indicate N sounding reference signal (SRS) resource combinations, where N is an integer greater than 1; and a processing unit, configured to perform data transmission based on the N SRS resource combinations, where each of the N SRS resource combinations corresponds to one beam.

In a possible implementation, each of the N SRS resource combinations has an equal quantity of SRS resources.

In a possible implementation, the N SRS resource combinations include a first SRS resource combination and a second SRS resource combination, the first SRS resource combination is determined from a first set, the second SRS resource combination is determined from a second set, and the second set is a subset of the first set.

In a possible implementation, that the terminal device performs data transmission based on the N SRS resource combinations includes: The terminal device performs repeated transmission of uplink data based on the N SRS resource combinations.

In a possible implementation, the second information is carried in a second field, the second field includes a plurality of subfields, and each subfield is used to indicate one SRS resource combination.

In a possible implementation, the second field is a sounding reference signal resource indicator (SRI) field in downlink control information (DCI).

In a possible implementation, an SRS resource combination indicated by the $1^{st}$ subfield in the plurality of subfields is determined from the first set based on a value of the $1^{st}$ subfield, and the first set includes a plurality of SRS resource combinations.

In a possible implementation, a length of the $1^{st}$ subfield in the plurality of subfields is determined based on a quantity of SRS resource combinations included in the first set.

In a possible implementation, the first set is determined based on a maximum quantity of spatial streams for uplink transmission and/or an SRS resource corresponding to the $1^{st}$ subfield, and the SRS resource corresponding to the $1^{st}$ subfield includes any one of the following: a configured or activated SRS resource set used for non-codebook based uplink transmission; an SRS resource set that corresponds to the $1^{st}$ subfield and that is used for non-codebook based uplink transmission; and an SRS resource subset corresponding to the $1^{st}$ subfield in the configured or activated SRS resource set used for non-codebook based uplink transmission.

In a possible implementation, an SRS resource combination indicated by $j^{th}$ subfield in the plurality of subfields is determined from the second set based on a value of the $j^{th}$ subfield, and the second set is a subset of the first set, where j is an integer greater than or equal to 2.

In a possible implementation, a length of the $j^{th}$ subfield is determined based on a quantity of SRS resource combinations included in the second set.

In a possible implementation, the second set includes an SRS resource combination that is in the first set and whose quantity of SRS resources is P, where P is a quantity of SRS resources included in the SRS resource combination indicated by the $1^{st}$ subfield, P is an integer greater than or equal to 1, and j is an integer greater than or equal to 2.

In a possible implementation, the second information is carried in a plurality of fields, and each field is used to determine one SRS resource combination.

In a possible implementation, the second information is carried in a second field, and the second field is used to indicate the N SRS resource combinations.

In a possible implementation, the N SRS resource combinations meet one or more of the following constraints: constraint 1: a quantity of SRS resources included in each of the N SRS resource combinations is less than or equal to a first preset threshold; constraint 2: a total quantity of SRS resources included in the N SRS resource combinations is less than or equal to a second preset threshold; constraint 3: each of the N SRS resource combinations corresponds to one SRS resource set or one SRS resource subset, and the SRS resource combinations correspond to different SRS resource sets or SRS resource subsets; and constraint 4: each of the N SRS resource combinations includes an equal quantity of SRS resources.

In a possible implementation, when a condition 2 is met, the second information is used to indicate the N sounding reference signal (SRS) resource combinations, and the condition 2 includes one or more of the following: a network device configures or activates a plurality of SRS resource sets used for non-codebook based uplink transmission; the network device configures or activates one SRS resource set used for non-codebook based uplink transmission, where the SRS resource set includes a plurality of SRS resource subsets; the network device configures or activates one SRS resource set used for non-codebook based uplink transmission, where the SRS resource set is associated with a plurality of CSI-RS resources; the network device indicates to perform physical uplink shared channel (PUSCH) transmission by using a plurality of SRS resource combinations; and the network device indicates that a PUSCH transmission mode is multi-beam based repeated PUSCH transmission.

In a possible implementation, Z bits in the DCI indicate one or more of the following information, where Z is a positive integer: a quantity of SRS resource combinations indicated by the DCI; information indicating whether the quantity of SRS resource combinations indicated by the DCI is greater than 1; information indicating whether the quantity of SRS resource combinations indicated by the DCI is equal to a quantity of configured SRS resource sets; and an SRS resource set corresponding to the SRS resource combination indicated by the DCI.

In a possible implementation, the Z bits are the first Z bits in the second field.

In a possible implementation, the transceiver unit is further configured to receive configuration information, where the configuration information is used to configure one SRS resource set and one channel state information reference signal (CSI-RS) resource, the SRS resource set includes K SRS resource subsets, the CSI-RS resource includes K antenna port combinations, and the K SRS resource subsets are in one-to-one correspondence with the K antenna port combinations, where K is an integer greater than or equal to 1; or the configuration information is used to configure one SRS resource set and K CSI-RS resources, the SRS resource set includes K SRS resource subsets, and the K SRS resource subsets are in one-to-one correspondence with the K CSI-RS resources; or the configuration information is used to configure K SRS resource sets and one CSI-RS resource, the one CSI-RS resource includes K antenna ports, and the K antenna ports are in one-to-one correspondence with the K SRS resource sets; or the configuration information is used to configure K SRS resource sets and K CSI-RS resources, and the K CSI-RS resources are in one-to-one correspondence with the K SRS resource sets.

According to a seventh aspect, this application provides a communication apparatus. The communication apparatus may be a network device, and includes: a transceiver unit, configured to send first information, where the first information is used to indicate a plurality of codebooks; and a processing unit, configured to perform data transmission based on the plurality of codebooks, where each of the plurality of codebooks corresponds to one beam.

In a possible implementation, the plurality of codebooks have a same quantity of layers.

In a possible implementation, the plurality of codebooks include a first codebook and a second codebook, the first codebook is determined from a first codebook set, the second codebook is determined from a second codebook set, and the second codebook set is a subset of the first codebook set.

In a possible implementation, the first information is carried in a plurality of subfields of a first field, and each subfield is used to indicate one codebook.

In a possible implementation, the first field is a precoding information and number of layers field in downlink control information (DCI).

In a possible implementation, a codebook indicated by the $1^{st}$ subfield in the plurality of subfields is determined from the first codebook set based on a value of the $1^{st}$ subfield, and the first codebook set includes a plurality of codebooks.

In a possible implementation, a length of the $1^{st}$ subfield in the plurality of subfields is determined based on a quantity of codebooks included in the first codebook set.

In a possible implementation, the first codebook set is determined based on one or more of a quantity of antenna ports of a terminal device, a used waveform, an uplink full-power transmission mode, a codebook type, and a maximum quantity of spatial streams used for uplink transmission.

In a possible implementation, a codebook indicated by an $i^{th}$ subfield in the plurality of subfields is determined from the second codebook set based on a value of the $i^{th}$ subfield, and the second codebook set is a subset of the first codebook set, where i is an integer greater than or equal to 2.

In a possible implementation, a length of the $i^{th}$ subfield is determined based on a quantity of codebooks included in the second codebook set.

In a possible implementation, the second codebook set includes a codebook whose quantity of codebook layers is Q in the first codebook set, where Q is a quantity of layers of the codebook indicated by the $1^{st}$ subfield in the plurality of subfields, and Q is an integer greater than or equal to 1.

In a possible implementation, the first information is carried in a plurality of fields, and each field is used to indicate one codebook.

In a possible implementation, the first information is carried in a first field, the first field is used to indicate a codebook whose quantity of layers is a, and the codebook whose quantity of layers is a is used to determine M codebooks whose quantities of layers each are b, where a is an integer greater than or equal to 2, M is an integer greater than or equal to 2, b is an integer greater than or equal to 1, and a=M*b.

In a possible implementation, the first information is carried in a first field, the first field is used to indicate one codebook set, and the codebook set includes one or more codebooks.

In a possible implementation, Z bits in the DCI indicate one or both of the following information, where Z is a positive integer: a quantity of codebooks indicated by the first field; and information indicating whether the quantity of codebooks indicated by the first field is greater than 1.

In a possible implementation, the Z bits are the first Z bits in the first field.

In a possible implementation, when a condition 1 is met, the first information is used to indicate the plurality of codebooks, and the condition 1 includes one or more of the following: the network device indicates the terminal device to perform multi-beam or multi-sounding reference signal (SRS) resource based physical uplink shared channel (PUSCH) transmission; the network device indicates the terminal device to perform PUSCH transmission by using the plurality of codebooks; and the network device indicates, to the terminal device, a plurality of beams or SRS resources used for PUSCH transmission.

According to an eighth aspect, this application provides a communication apparatus. The communication apparatus may be a network device, and includes: a transceiver unit, configured to send second information, where the second information is used to indicate N sounding reference signal (SRS) resource combinations, where N is an integer greater than 1; and a processing unit, configured to perform data transmission based on the N SRS resource combinations, where each of the N SRS resource combinations corresponds to one beam.

In a possible implementation, each of the N SRS resource combinations has an equal quantity of SRS resources.

In a possible implementation, the N SRS resource combinations include a first SRS resource combination and a second SRS resource combination, the first SRS resource combination is determined from a first set, the second SRS resource combination is determined from a second set, and the second set is a subset of the first set.

In a possible implementation, the processing unit is configured to perform repeated transmission based on the N SRS resource combinations.

In a possible implementation, the second information is carried in a second field, the second field includes a plurality of subfields, and each subfield is used to indicate one SRS resource combination.

In a possible implementation, the second field is a sounding reference signal resource indicator (SRI) field in downlink control information (DCI).

In a possible implementation, an SRS resource combination indicated by the $1^{st}$ subfield in the plurality of subfields is determined from the first set based on a value of the $1^{st}$ subfield, and the first set includes a plurality of SRS resource combinations.

In a possible implementation, a length of the $1^{st}$ subfield in the plurality of subfields is determined based on a quantity of SRS resource combinations included in the first set.

In a possible implementation, the first set is determined based on a maximum quantity of spatial streams for uplink transmission and/or an SRS resource corresponding to the $1^{st}$ subfield, and the SRS resource corresponding to the $1^{st}$ subfield includes any one of the following: a configured or activated SRS resource set used for non-codebook based uplink transmission; an SRS resource set that corresponds to the $1^{st}$ subfield and that is used for non-codebook based uplink transmission; and an SRS resource subset corresponding to the $1^{st}$ subfield in the configured or activated SRS resource set used for non-codebook based uplink transmission.

In a possible implementation, an SRS resource combination indicated by $j^{th}$ subfield in the plurality of subfields is determined from the second set based on a value of the $j^{th}$ subfield, and the second set is a subset of the first set, where j is an integer greater than or equal to 2.

In a possible implementation, a length of the $j^{th}$ subfield is determined based on a quantity of SRS resource combinations included in the second set.

In a possible implementation, the second set includes an SRS resource combination that is in the first set and whose quantity of SRS resources is P, where P is a quantity of SRS resources included in the SRS resource combination indicated by the $1^{st}$ subfield, P is an integer greater than or equal to 1, and j is an integer greater than or equal to 2.

In a possible implementation, the second information is carried in a plurality of fields, and each field is used to determine one SRS resource combination.

In a possible implementation, the second information is carried in a second field, and the second field is used to indicate the N SRS resource combinations.

In a possible implementation, the N SRS resource combinations meet one or more of the following constraints: constraint 1: a quantity of SRS resources included in each of the N SRS resource combinations is less than or equal to a first preset threshold; constraint 2: a total quantity of SRS resources included in the N SRS resource combinations is less than or equal to a second preset threshold; constraint 3: each of the N SRS resource combinations corresponds to one SRS resource set or one SRS resource subset, and the SRS resource combinations correspond to different SRS resource sets or SRS resource subsets; and constraint 4: each of the N SRS resource combinations includes an equal quantity of SRS resources.

In a possible implementation, when a condition 2 is met, the second information is used to indicate the N sounding reference signal (SRS) resource combinations, and the condition 2 includes one or more of the following: the network device configures or activates a plurality of SRS resource sets used for non-codebook based uplink transmission; the network device configures or activates one SRS resource set used for non-codebook based uplink transmission, where the SRS resource set includes a plurality of SRS resource subsets; the network device configures or activates one SRS resource set used for non-codebook based uplink transmission, where the SRS resource set is associated with a plurality of CSI-RS resources; the network device indicates to perform physical uplink shared channel (PUSCH) transmission by using a plurality of SRS resource combinations; and the network device indicates that a PUSCH transmission mode is multi-beam based repeated PUSCH transmission.

In a possible implementation, Z bits in the DCI indicate one or more of the following information, where Z is a positive integer: a quantity of SRS resource combinations indicated by the DCI; information indicating whether the quantity of SRS resource combinations indicated by the DCI is greater than 1; information indicating whether the quantity of SRS resource combinations indicated by the DCI is equal to a quantity of configured SRS resource sets; and an SRS resource set corresponding to the SRS resource combination indicated by the DCI.

In a possible implementation, the Z bits are the first Z bits in the second field.

In a possible implementation, the transceiver unit is further configured to send configuration information, where the configuration information is used to configure one SRS resource set and one channel state information reference signal (CSI-RS) resource, the SRS resource set includes K SRS resource subsets, the CSI-RS resource includes K antenna port combinations, and the K SRS resource subsets are in one-to-one correspondence with the K antenna port combinations, where K is an integer greater than or equal to 1; or the configuration information is used to configure one SRS resource set and K CSI-RS resources, the SRS resource set includes K SRS resource subsets, and the K SRS resource subsets are in one-to-one correspondence with the K CSI-RS resources; or the configuration information is used to configure K SRS resource sets and one CSI-RS resource, the one CSI-RS resource includes K antenna ports, and the K antenna ports are in one-to-one correspondence with the K SRS resource sets; or the configuration information is used to configure K SRS resource sets and K CSI-RS resources, and the K CSI-RS resources are in one-to-one correspondence with the K SRS resource sets.

According to a ninth aspect, this application further provides a communication apparatus. The communication apparatus may be a terminal device or a chip. The communication apparatus includes a processor, configured to implement any data transmission method provided in the first aspect or the second aspect. The communication apparatus may further include a memory, configured to store program instructions and data. The memory may be a memory integrated into the communication apparatus, or an off-chip memory disposed outside the communication apparatus. The memory is coupled to the processor, and the processor may invoke and execute the program instructions stored in the memory, to implement any data transmission method provided in the first aspect or the second aspect. The memory may be disposed in the processor, or the memory and the processor are independently disposed. The communication apparatus may further include a transceiver (a communication interface), and the transceiver is used by the communication apparatus to communicate with another device (for example, a network device).

According to a tenth aspect, this application further provides a communication apparatus. The communication apparatus may be a network device or a chip. The communication apparatus includes a processor, configured to implement any data transmission method provided in the third aspect or the fourth aspect. The communication apparatus may further include a memory, configured to store program instructions and data. The memory may be a memory integrated into the communication apparatus, or an off-chip memory disposed outside the communication apparatus. The memory is coupled to the processor, and the processor may invoke and execute the program instructions stored in the memory, to implement any data transmission method provided in the third aspect or the fourth aspect. The memory may be disposed in the processor, or the memory and the processor are independently disposed. The communication apparatus may further include a transceiver (a communication interface), and the transceiver is used by the communication apparatus to communicate with another device (for example, a terminal device).

According to an eleventh aspect, this application provides a computer-readable storage medium, including instructions. When the instructions are run on a computer, the computer is enabled to perform any data transmission method provided in any one of the first aspect to the fourth aspect.

According to a twelfth aspect, this application provides a computer program product including instructions. When the computer program product runs on a computer, the computer is enabled to perform any data transmission method provided in any one of the first aspect to the fourth aspect.

According to a thirteenth aspect, this application provides a chip system. The chip system includes a processor and may further include a memory, to implement any data transmission method provided in any one of the first aspect to the fourth aspect. The chip system may include a chip, or may include a chip and another discrete component.

According to a fourteenth aspect, this application provides a communication system. The system includes the communication apparatuses in the fifth aspect and the seventh aspect, or the system includes the communication apparatuses in the sixth aspect and the eighth aspect.

DESCRIPTION OF EMBODIMENTS

Figure 1:
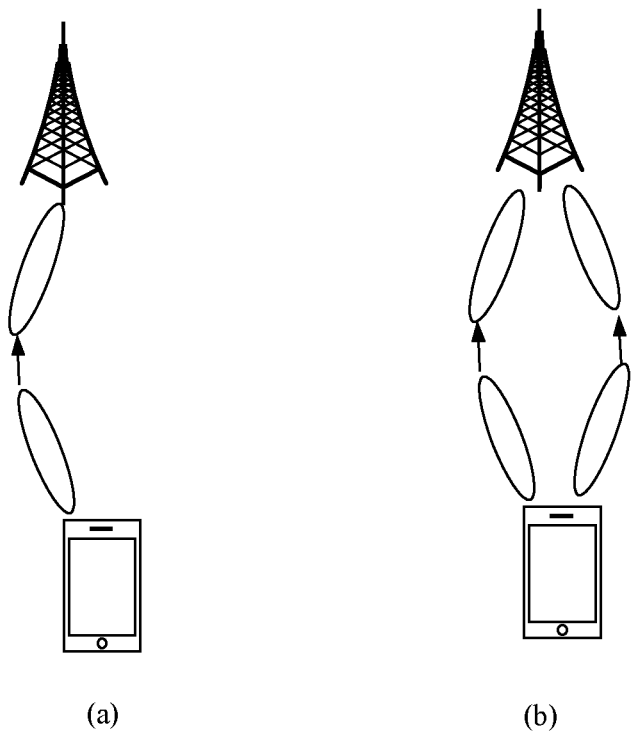
FIG. 1 is a schematic diagram of beam based data transmission in the conventional technology.

To make descriptions of the following embodiments clear and concise, related concepts or technologies are first briefly described.

Beam: A 5G communication system may use a high frequency for communication, for example, use a signal in an ultra-high frequency band (>6 GHz) for data transmission. A main problem of high-frequency communication is that signal energy sharply decreases as a transmission distance increases, resulting in a short signal transmission distance. To overcome this problem, a beamforming technology is used in the high-frequency communication, in which a large-scale antenna array is used for signal processing, so that signal energy is concentrated in a small range, to form a signal similar to an optical beam (where the signal is referred to as an analog beam, a beam for short), thereby increasing a transmission distance. The beam may be a wide beam, a narrow beam, or a beam of another type. The beamforming technology may include a digital beamforming technology, an analog beamforming technology, a hybrid digital/analog beamforming technology, or the like.

A beam may also be referred to as or equivalent to a spatial domain filter, a spatial filter, a spatial domain parameter, a spatial parameter, a spatial domain setting, a spatial setting, a spatial relation, a transmission configuration indicator (TCI) state, quasi-colocation (QCL) information, a QCL assumption, a QCL indication, or the like.

Beams may include a transmit beam (Tx beam) and a receive beam (Rx beam). The transmit beam is a beam used to send a signal, and may be specifically distribution of signal strength formed in different directions in space after the signal is transmitted by using an antenna. The receive beam is a beam used to receive a signal, and may be specifically distribution of signal strength of a radio signal received from an antenna in different directions in space. An uplink transmit beam may be indicated by using a spatial relation, an uplink (UL) TCI-state, or an SRS resource. A downlink transmit beam may be indicated by using QCL information or a downlink (DL) TCI-state.

It should be understood that the transmit beam may also be referred to as a spatial domain transmission filter, a spatial transmission filter, a spatial domain transmission parameter, a spatial transmission parameter, a spatial domain transmission setting, or a spatial transmission setting. The receive beam may also be referred to as a spatial domain reception filter, a spatial reception filter, a spatial domain reception parameter, a spatial reception parameter, a spatial domain reception setting, or a spatial reception setting. The foregoing concepts are equivalent and can be replaced with each other.

SRS resource: The SRS resource is a reference signal resource sent by a terminal device to a network device, and may be used to measure an uplink channel. The network device may configure a plurality of SRS resource sets for the terminal device, where each SRS resource set corresponds to one usage parameter. Usage parameters may include four values: beam management, a codebook, a non-codebook, and antenna switching. Usage parameters with different values represent different purposes or types of SRS resources.

An SRS resource included in an SRS resource set whose usage is beam management is an SRS resource used for uplink beam management. Each SRS resource or one port of the SRS resource may be used to measure one beam. Specifically, the terminal device sends, by using one beam, a reference signal corresponding to one SRS resource or one port of the SRS resource, and the network device may determine quality of each uplink transmit beam by measuring quality of a reference signal corresponding to each SRS resource or the port of the SRS resource, thereby implementing uplink beam management.

An SRS resource included in an SRS resource set whose usage is a codebook is an SRS resource used for codebook based uplink transmission. In other words, for codebook based PUSCH transmission, an optimal codebook (where a codebook is a precoding matrix) for PUSCH transmission needs to be determined by using an SRS resource whose usage is a codebook. A specific procedure is as follows: The terminal device sends an SRS resource whose usage is a codebook to the network device. The network device measures the SRS resource and calculates the optimal codebook for PUSCH transmission. The network device indicates the optimal codebook to the terminal device by using DCI. The terminal device performs PUSCH transmission by using the codebook.

An SRS resource included in an SRS resource set whose usage is a non-codebook is an SRS resource used for non-codebook based uplink transmission. In other words, for non-codebook based PUSCH transmission, an optimal codebook for PUSCH transmission needs to be determined by using an SRS resource whose usage is a non-codebook.

An SRS resource included in an SRS resource set whose usage is antenna switching is an SRS resource used for channel measurement based on antenna switching. The terminal device may send an SRS to the network device on an SRS resource by using all antennas, so that the network device measures channel information corresponding to all the antennas. Due to a power limitation, some terminal devices can send SRSs by using only some uplink antennas at a time, and need to send SRSs for a plurality of times (where a different antenna is used each time), so that the network device can measure the channel information corresponding to all the antennas.

Beam based data transmission: For example, in uplink transmission, as shown in (a) in FIG. 1, the terminal device may send a PUSCH by using a single beam, or as shown in (b) in FIG. 1, the terminal device may send PUSCHs by using a plurality of beams, for example, simultaneously transmit same PUSCHs by using a plurality of beams, or separately transmit same PUSCHs by using a plurality of beams at different time points, to improve PUSCH transmission reliability.

During data transmission, data needs to be preprocessed by using a specific codebook, to achieve a best transmission effect. For example, in codebook based uplink transmission, the network device may indicate a codebook to the terminal device. In non-codebook based uplink transmission, the network device may indicate a group of SRS resources to the terminal device, and the terminal device may determine a codebook based on the group of SRS resources indicated by the network device.

For example, in the codebook based uplink transmission, the network device may indicate a codebook to the terminal device by using a precoding information and number of layers field in DCI. Specifically, the field may indicate a value, and the terminal device searches a corresponding table based on the value, to determine a codebook. For example, when the value indicated by the field is 2, that is, a bit field mapped to index is 2, and a codebook subset type is fullyAndPartialAndNonCoherent, a codebook whose quantity of layers is 2 and that is numbered 0 (2 layers: TPMI=0) may be determined by searching Table 1.

TABLE 1

| Bit field mapped to index | codebookSubset = fullyAndPartialAndNonCoherent |
| --- | --- |
| 0 | 1 layer: TPMI = 0 |
| 1 | 1 layer: TPMI = 1 |
| 2 | 2 layers: TPMI = 0 |
| 3 | 1 layer: TPMI = 2 |
| 4 | 1 layer: TPMI = 3 |
| 5 | 1 layer: TPMI = 4 |
| 6 | 1 layer: TPMI = 5 |
| 7 | 2 layers: TPMI = 1 |
| 8 | 2 layers: TPMI = 2 |
| 9-15 | Reserved |

In the non-codebook based uplink transmission, the network device may indicate a group of SRS resources by using an SRI field in DCI. The field may indicate a value, and the terminal device searches a corresponding table based on the value, to determine a group of SRS resources. For example, when the value indicated by the field is 5, that is, when a bit field mapped to index is 5, and $N_{SRS}$=4 (where a quantity of SRS resources included in an SRS resource set is 4), a group of SRS resources {0, 2} may be determined by searching Table 2.

TABLE 2

| Bit field mapped to index | SRI(s), $N_{SRS}$ = 4 |
|---|---|
| 0 | 0 |
| 1 | 1 |
| 2 | 2 |
| 3 | 3 |
| 4 | 0, 1 |
| 5 | 0, 2 |
| 6 | 0, 3 |
| 7 | 1, 2 |
| 8 | 1, 3 |
| 9 | 2, 3 |
| 10 to 15 | Reserved |

Currently, in the codebook based uplink transmission, the precoding information and number of layers field in the DCI can indicate only one codebook. If a plurality of codebooks need to be indicated, a plurality of precoding information and number of layers fields or fields having similar functions need to be added to the DCI, resulting in high signaling overheads. Similarly, in the non-codebook based uplink transmission, the SRI field in the DCI can indicate only one group of SRS resources. If a plurality of codebooks need to be indicated, a plurality of SRI fields or fields having similar functions need to be added to the DCI, resulting in high signaling overheads.

To resolve the foregoing problem, embodiments of this application provide a data transmission method. A network device may indicate a plurality of codebooks to a terminal device by using first information, that is, a quantity of codebooks indicated by the network device is extended, so that the terminal device can perform multi-beam based data transmission based on the plurality of codebooks indicated by the first information. The plurality of codebooks indicated by the first information may have a same quantity of layers. In this way, after a quantity of layers of one of the plurality of codebooks is determined, a quantity of layers of another codebook is determined accordingly, thereby reducing signaling overheads for indicating the plurality of codebooks.

Embodiments of this application further provide a data transmission method. A network device may indicate a plurality of SRS resource combinations to a terminal device by using first information, that is, a quantity of SRS resource combinations that can be indicated by the network device is extended, so that the terminal device can perform multi-beam based data transmission based on the plurality of SRS resource combinations indicated by the first information. Each of N SRS resource combinations may have an equal quantity of SRS resources. In this way, the terminal device may determine, based on a quantity of SRS resources in one of the SRS resource combinations, a quantity of SRS resources in a remaining SRS resource combination, thereby reducing signaling overheads for indicating the quantity of SRS resources in the remaining SRS resource combination.

The technical solutions in embodiments of this application may be applied to various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5G mobile communication system, a new radio (NR) system, or the like. The 5G mobile communication system in this application includes a non-standalone (NSA) 5G mobile communication system and/or a standalone (SA) 5G mobile communication system. The technical solutions provided in this application may be further applied to a future communication system, for example, a 6th generation mobile communication system. Alternatively, the communication system may be a future evolved public land mobile network (PLMN), a device-to-device (D2D) network, a machine-to-machine (M2M) network, an interne of things (IoT) network, or another network.

Figure 2:
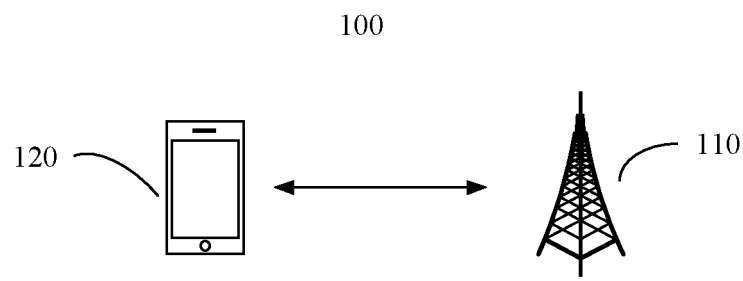
FIG. 2 is a schematic architectural diagram of a system to which a data transmission method is applicable according to an embodiment of this application.

FIG. 2 shows a communication system 100 to which this application is applicable. The communication system 100 is in a single carrier scenario or a carrier aggregation (CA) scenario. The communication system 100 includes a network device 110 and a terminal device 120. The network device 110 communicates with the terminal device 120 by using a wireless network. It should be understood that the network device 110 in FIG. 2 may include one or more cells. When a transmission direction of the communication system 100 is uplink transmission, the terminal device 120 is a transmit end, and the network device 110 is a receive end. When the transmission direction of the communication system 100 is downlink transmission, the network device 110 is a transmit end, and the terminal device 120 is a receive end.

Figure 3:
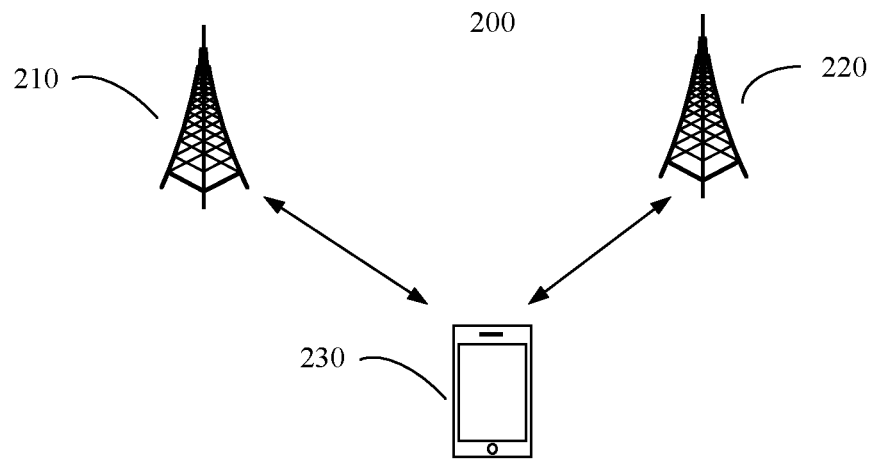
FIG. 3 is a schematic architectural diagram of another system to which a data transmission method is applicable according to an embodiment of this application is applicable.

FIG. 3 shows another communication system 200 to which this application is applicable. The communication system 200 is in a dual connectivity (DC) or coordinated multipoint transmission/reception (CoMP) scenario. The communication system 200 includes a network device 210, a network device 220, and a terminal device 230. The network device 210 is a network device initially accessed by the terminal device 230, and is responsible for RRC communication with the terminal device 230. The network device 220 is added during RRC reconfiguration, and is configured to provide an additional radio resource. The terminal device 230 on which CA is configured is connected to the network device 210 and the network device 220. A link between the network device 210 and the terminal device 230 may be referred to as a first link, and a link between the network device 220 and the terminal device 230 may be referred to as a second link.

The foregoing communication systems to which this application is applicable are merely examples for description, and a communication system to which this application is applicable is not limited thereto. For example, the communication system may include another quantity of network devices and another quantity of terminal devices.

It should be understood that the technical solutions in embodiments of this application are applicable to a case in which a primary cell/primary serving cell (PCell) uses a high frequency or a low frequency, and a secondary cell/secondary serving cell (SCell) uses a high frequency or a low frequency. For example, when the PCell uses a low frequency, the SCell uses a high frequency. Usually, the low frequency and the high frequency are relative to each other, or may be differentiated based on a specific frequency, for example, 6 GHz.

The terminal device in embodiments of this application may be user equipment, an access terminal, a subscriber unit, a subscriber station, a mobile station, a remote station, a remote terminal, a mobile device, a user terminal, a terminal, a wireless communication device, a user agent, a user apparatus, or the like. Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a PLMN, or the like. This is not limited in embodiments of this application.

By way of example but not limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smartwatches or smart glasses, and devices that focus on only one type of application function and need to work with other devices such as smartphones, such as various smart bands or smart jewelry for monitoring physical signs.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrow band (NB) technology.

In addition, in embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and transmitting uplink data to the network device.

The network device in embodiments of this application may be a device configured to communicate with the terminal device. The network device may be a base transceiver station (BTS) in a GSM system or a CDMA system, may be a NodeB (NB) in a WCDMA system, may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like. This is not limited in embodiments of this application.

The network device in embodiments of this application may be a device in a wireless network, for example, a radio access network (RAN) node that connects a terminal to the wireless network. Currently, some RAN nodes are, for example, a base station, a next-generation NodeB gNB, a TRP, an evolved NodeB (eNB), a home NodeB, a baseband unit (BBU), or an access point (AP) in a Wi-Fi system. In a network structure, the network device may include a centralized unit (CU) node, or a distributed unit (DU) node, or a RAN device including a CU node and a DU node.

The terminal device or the network device in FIG. 2 or FIG. 3 in embodiments of this application may be implemented by using a device, or may be a functional module in a device. This is not specifically limited in embodiments of this application. It may be understood that the foregoing function may be a network element in a hardware device, a software function running on dedicated hardware, a virtualized function instantiated on a platform (for example, a cloud platform), or a chip system. In this embodiment of this application, the chip system may include a chip, or may include a chip and another discrete component.

Figure 4:
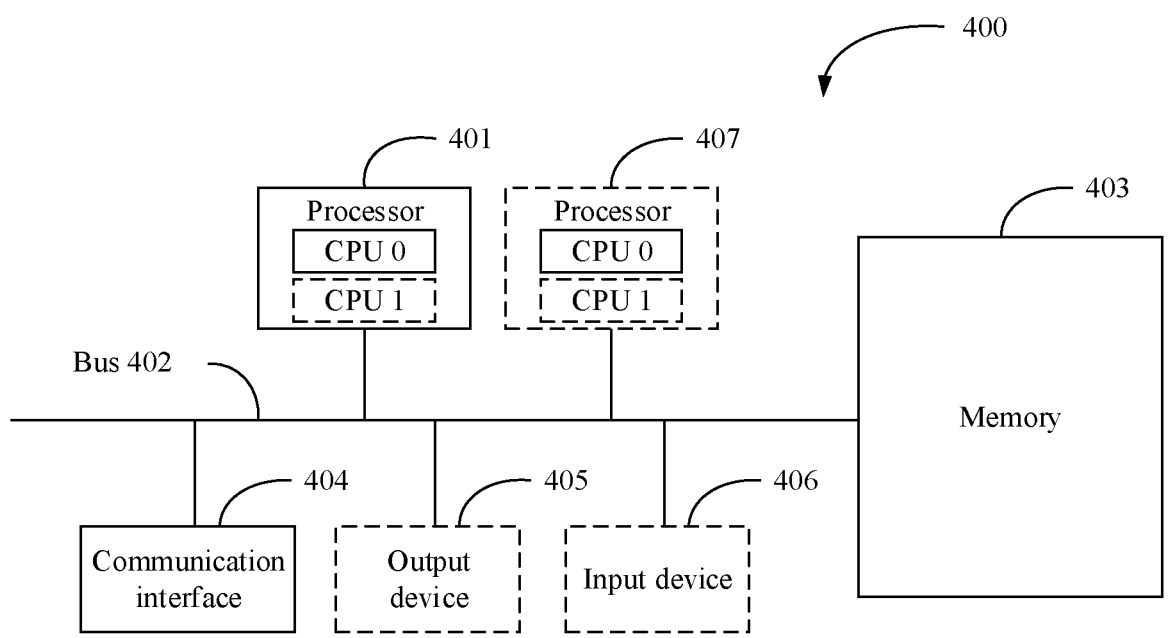
FIG. 4 is a schematic structural diagram of a terminal device according to an embodiment of this application.

For example, an apparatus for implementing the function of the terminal device provided in embodiments of this application may be implemented by an apparatus 400 in FIG. 4. FIG. 4 is a schematic diagram of a hardware structure of the apparatus 400 according to an embodiment of this application. The apparatus 400 includes at least one processor 401, configured to implement the function of the terminal device provided in embodiments of this application. The apparatus 400 may further include a bus 402 and at least one communication interface 404. The apparatus 400 may further include a memory 403.

In this embodiment of this application, the processor may be a central processing unit (CPU), a general-purpose processor, a network processor (NP), a digital signal processor (DSP), a microprocessor, a microcontroller unit, or a programmable logic device (PLD). The processor may alternatively be any other apparatus having a processing function, for example, an application-specific integrated circuit (ASIC), a field programmable gate array (FPGA) or another programmable logic device, a transistor logic device, a hardware component, a software module, or any combination thereof.

The bus 402 may be configured to transmit information between the foregoing components.

The communication interface 404 is configured to communicate with another device or a communication network, for example, an Ethernet, a radio access network (RAN), or a wireless local area network (WLAN). The communication interface 404 may be an interface, a circuit, a transceiver, or another apparatus that can implement communication. This is not limited in this application. The communication interface 404 may be coupled to the processor 401. The coupling in this embodiment of this application may be an indirect coupling or a communication connection between apparatuses, units, or modules in an electrical form, a mechanical form, or another form, and is used for information exchange between the apparatuses, the units, or the modules.

In this embodiment of this application, the memory may be a read-only memory (ROM), another type of static storage device that can store static information and instructions, a random access memory (RAM), another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium, another magnetic storage device, or any other medium that can be used to carry or store expected program code in a form of instructions or a data structure and that can be accessed by a computer. However, the memory is not limited thereto. The memory may exist independently, or may be coupled to the processor, for example, through the bus 402. The memory may alternatively be integrated with the processor.

The memory 403 is configured to store program instructions, and the processor 401 controls the execution, to implement a data transmission method provided in the following embodiments of this application. The processor 401 is configured to invoke and execute the instructions stored in the memory 403, to implement the data transmission method provided in the following embodiments of this application.

Optionally, the computer-executable instructions in this embodiment of this application may also be referred to as application program code. This is not specifically limited in this embodiment of this application.

Optionally, the memory 403 may be included in the processor 401.

During specific implementation, in an embodiment, the processor 401 may include one or more CPUs, for example, a CPU 0 and a CPU 1 in FIG. 4.

During specific implementation, in an embodiment, the apparatus 400 may include a plurality of processors, for example, the processor 401 and a processor 407 in FIG. 4. Each of the processors may be a single-core processor, or may be a multi-core processor. The processor herein may be one or more devices, circuits, and/or processing cores configured to process data (for example, computer program instructions).

During specific implementation, in an embodiment, the apparatus 400 may further include an output device 405 and an input device 406. The output device 405 is coupled to the processor 401, and may display information in a plurality of manners. For example, the output device 405 may be a liquid crystal display (LCD), a light emitting diode (LED) display device, a cathode ray tube (CRT) display device, or a projector. The input device 406 is coupled to the processor 401, and may receive an input from a user in a plurality of manners. For example, the input device 406 may be a touchscreen device or a sensing device.

The apparatus 400 may be a general-purpose device or a dedicated device. During specific implementation, the terminal device 400 may be a vehicle-mounted terminal, a transportation device with a built-in computer (processor), or a device having a structure similar to that in FIG. 4. A type of the apparatus 400 is not limited in the embodiments of this application.

In this embodiment of this application, the communication interface (for example, a transceiver) 404 may be configured to receive first information, where the first information is used to indicate a plurality of codebooks; and the processor 401 and/or the processor 407 may be configured to perform data transmission based on the plurality of codebooks, where each of the plurality of codebooks corresponds to one beam. Alternatively, the communication interface 404 may be configured to receive second information, where the second information is used to indicate N SRS resource combinations, where N is an integer greater than 1; and the processor 401 and/or the processor 407 may be configured to perform data transmission based on the N SRS resource combinations, where each of the N SRS resource combinations corresponds to one beam.

Figure 5:
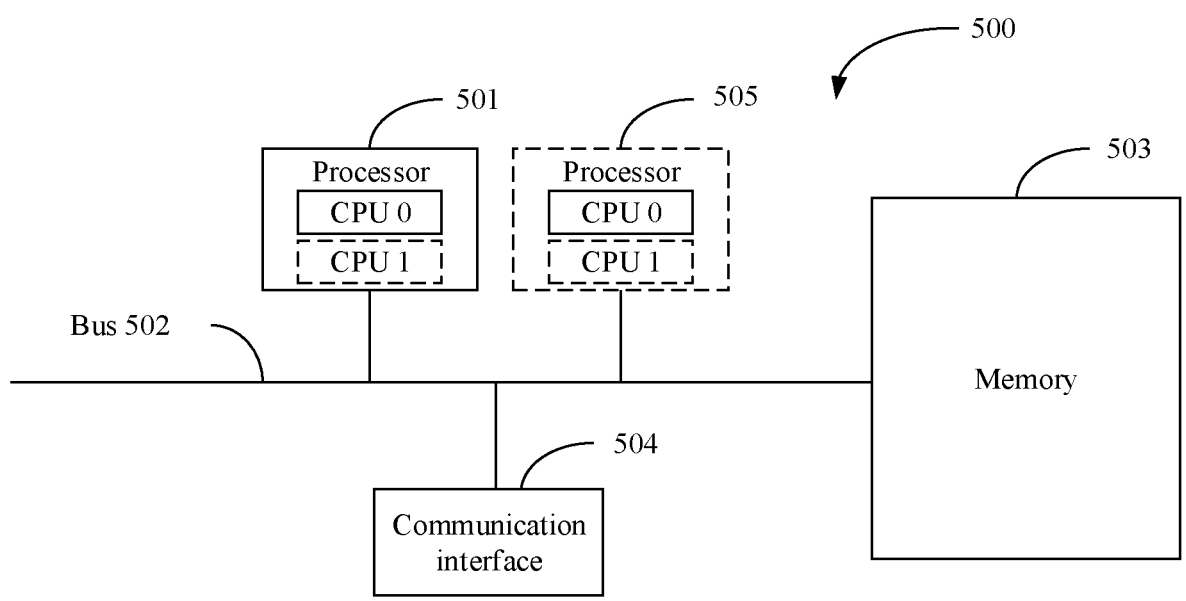
FIG. 5 is a schematic structural diagram of a network device according to an embodiment of this application.

For example, an apparatus for implementing a function of the network device provided in the embodiments of this application may be implemented by an apparatus 500 in FIG. 5. FIG. 5 is a schematic diagram of a hardware structure of the apparatus 500 according to an embodiment of this application. The apparatus 500 includes at least one processor 501, configured to implement the function of the network device provided in the embodiments of this application. The apparatus 500 may further include a bus 502 and at least one communication interface 504. The apparatus 500 may further include a memory 503.

The bus 502 may be configured to transmit information between the foregoing components.

The communication interface 504 is configured to communicate with another device or a communication network, for example, an Ethernet, a RAN, or a WLAN. The communication interface 504 may be an interface, a circuit, a transceiver, or another apparatus that can implement communication. This is not limited in this application. The communication interface 504 may be coupled to the processor 501.

The memory 503 is configured to store program instructions, and the processor 501 controls the execution, to implement a data transmission method provided in the following embodiments of this application. For example, the processor 501 is configured to invoke and execute the instructions stored in the memory 503, to implement the data transmission method provided in the following embodiments of this application.

Optionally, the memory 503 may be included in the processor 501.

In specific implementation, in an embodiment, the processor 501 may include one or more CPUs, for example, a CPU 0 and a CPU 1 in FIG. 5.

During specific implementation, in an embodiment, the apparatus 500 may include a plurality of processors, for example, the processor 501 and a processor 505 shown in FIG. 5. Each of the processors may be a single-core processor, or may be a multi-core processor. The processor herein may be one or more devices, circuits, and/or processing cores configured to process data (for example, computer program instructions).

The apparatus 500 may be a general-purpose device or a dedicated device. During specific implementation, the apparatus 500 may be a vehicle-mounted terminal, a transportation device with a built-in computer (processor), or a device having a structure similar to that in FIG. 5. A type of the apparatus 500 is not limited in this embodiment of this application.

In this embodiment of this application, the communication interface (for example, a transceiver) 504 may be configured to send first information, where the first information is used to indicate a plurality of codebooks; and the processor 501 and/or the processor 505 may be configured to perform data transmission based on the plurality of codebooks, where each of the plurality of codebooks corresponds to one beam. Alternatively, the communication interface 504 may be configured to send second information, where the second information is used to indicate N SRS resource combinations, where N is an integer greater than 1; and the processor 501 and/or the processor 505 may be configured to perform data transmission based on the N SRS resource combinations, where each of the N SRS resource combinations corresponds to one beam.

In embodiments of this application, the terminal device or the network device includes a hardware layer, an operating system layer running on the hardware layer, and an application layer running on the operating system layer. The hardware layer includes hardware such as a CPU, a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this application is not particularly limited in embodiments of this application, provided that a program that records code of the method provided in embodiments of this application can be run to perform communication according to the method provided in embodiments of this application. For example, the execution body of the method provided in embodiments of this application may be the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier or medium. For example, a computer-readable medium may include but is not limited to a magnetic storage device (for example, a hard disk, a floppy disk, or a magnetic tape), an optical disc (for example, a CD or a digital versatile disc (DVD)), a smart card and a flash memory device (for example, an EPROM, a card, a stick, or a key drive). In addition, various storage media described in this specification may represent one or more devices and/or other machine-readable media that are configured to store information. The term "machine-readable media" may include but is not limited to a radio channel, and various other media that can store, contain and/or carry instructions and/or data.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that: With evolution of the network architecture and emergence of new service scenarios, the technical solutions provided in embodiments of this application are also applicable to similar technical problems.

In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in descriptions of this application, unless otherwise specified, "at least one" means one or more. "A plurality of" means two or more than two. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

It should be noted that, in embodiments of this application, "of", "corresponding, relevant", and "corresponding" may be interchangeably used sometimes, and signaling and a message may be interchangeably used sometimes. It should be noted that when a difference is not emphasized, meanings to be expressed are consistent.

Names of messages between network elements or names of parameters in messages in the following embodiments of this application are merely examples, and may alternatively be other names during specific implementation. This is not specifically limited in embodiments of this application.

In embodiments of this application, a "signal" may alternatively be a "channel" or a "signal resource". Sometimes, the three may be replaced with each other. This is not limited in this application.

In embodiments of this application, a codebook and a precoding matrix may be equivalent concepts. A beam may be replaced with a spatial domain filter, a spatial filter, a spatial domain parameter, a spatial parameter, a spatial domain setting, a spatial setting, QCL information, a QCL assumption, a QCL indication, a TCI-state (including a DL TCI-state and a UL TCI-state), a spatial relation, or the like. The foregoing terms are equivalent to each other. Alternatively, the beam may be replaced with another term representing the beam. This is not limited in this application.

Figure 6:
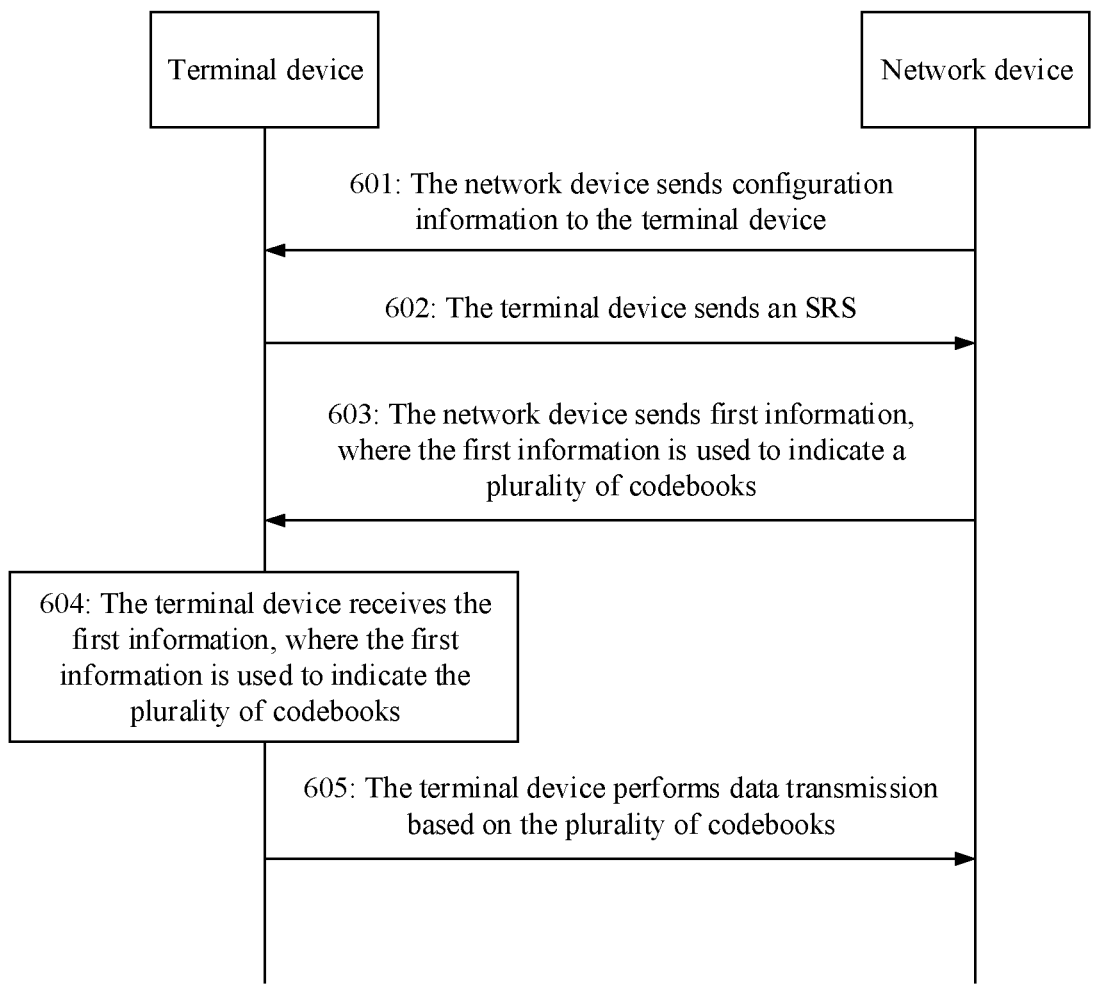
FIG. 6 is a schematic diagram of signal exchange to which a data transmission method is applicable according to an embodiment of this application.

As shown in FIG. 6, an embodiment of this application provides a data transmission method, including the following steps.

601: A network device sends configuration information to a terminal device.

The configuration information includes SRS related information. For example, the configuration information may include an SRS resource set whose usage parameter value is a codebook. The SRS resource set may include one or more SRS resources. One piece of spatialRelationInfo may be configured for each SRS resource. Each SRS resource may include one or more antenna ports.

The configuration information may be determined by the network device based on information reported by the terminal device. The information reported by the terminal device may include one or more of the following parameters: a quantity (number/quantity) of SRS resource sets whose configurable usage is a codebook, a quantity of SRS resources included in one SRS resource set, a quantity of ports of an SRS resource, and a quantity of different transmit beams corresponding to each SRS resource in one SRS resource set.

602: The terminal device sends an SRS.

After receiving the configuration information sent by the network device, the terminal device may send, to the network device based on the configuration information, an SRS corresponding to the one or more SRS resources.

603: The network device sends first information, where the first information is used to indicate a plurality of codebooks.

The network device measures an SRS corresponding to each SRS resource, to determine channel information corresponding to each SRS. Then, the network device may indicate one SRS resource to the terminal device, so that the terminal device performs data transmission (for example, PUSCH transmission) based on the SRS resource. The terminal device may send a PUSCH by using a transmit beam of the SRS resource. Alternatively, the network device may indicate a plurality of SRS resources to the terminal device, so that the terminal device performs PUSCH transmission based on the plurality of SRS resources. The terminal device may simultaneously send PUSCHs by using transmit beams of the plurality of SRS resources, or separately send PUSCHs at different time points by using transmit beams of the plurality of SRS resources. The PUSCHs corresponding to the SRS resources may be used to transmit a same redundancy version (RV) or different RVs of a same transport block (TB) or a same codeword, or may be used to transmit different data streams corresponding to a same TB or a same codeword, or may be used to transmit different TBs or codewords.

Further, the network device may indicate, to the terminal device, a codebook corresponding to each SRS resource, so that when performing PUSCH transmission based on one SRS resource, the terminal device uses a codebook corresponding to the SRS resource. For example, the network device may indicate, by using DCI, the codebook corresponding to each SRS resource. Alternatively, the network device may indicate, by using other signaling such as media access control control element (MAC CE) signaling or RRC signaling, the codebook corresponding to each SRS resource. This is not limited in this application.

604: The terminal device receives the first information, where the first information is used to indicate the plurality of codebooks.

The plurality of codebooks indicated by the first information have a same quantity of layers. In this way, the terminal device may determine, based on a quantity of layers of one of the codebooks, a quantity of layers of a remaining codebook, thereby reducing signaling overheads for indicating the quantity of layers of the remaining codebook.

The plurality of codebooks indicated by the first information may include a first codebook and a second codebook, the first codebook may be determined from a first codebook set, the second codebook may be determined from a second codebook set, and the second codebook set is a subset of the first codebook set. Optionally, the second codebook set may be a proper subset of the first codebook set. Therefore, a quantity of bits used to indicate the second codebook may be less than a quantity of bits used to indicate the first codebook, thereby reducing signaling overheads.

In some embodiments, the first information may be carried in a first field, that is, the plurality of codebooks may be indicated by using one field (the first field). The first field may include a plurality of subfields, and each subfield is used to indicate one codebook. The subfield refers to some bits in the first field, that is, one or more bits in the first field may be considered as one subfield. For example, the first field may be a precoding information field and number of layers field in the DCI. Alternatively, the first information may be carried in a plurality of fields, and each field is used to indicate one codebook. To be specific, the plurality of codebooks are indicated by using the plurality of fields, and each field indicates one codebook.

The following describes a method for determining the plurality of codebooks by using an example in which the first information is carried in the plurality of subfields (for example, L subfields) in the first field. It should be understood that a subfield in the following method may alternatively be replaced with a field. L may be a quantity of SRS resources in an SRS resource set whose configured usage is a codebook, or a quantity of SRS resources used for transmission of same PUSCHs. Alternatively, L may be indicated by using RRC/MAC CE/DCI signaling. If L is configured by using the RRC signaling, L may be a mandatory parameter or an optional parameter. Alternatively, L may be reported through a UE capability reporting process. Alternatively, L may be specified in a protocol, or L may be a default value. A value/an upper limit of L may be any one of 1, 2, 3, 4, 5, 6, 7, 8, 12, or 16. A value range of L may be {1, 2, 3, 4, 5, 6, 7, 8, 12, 16} or a subset thereof. It should be understood that the following process is also applicable to a case in which a plurality of fields (for example, L fields) are used to indicate the plurality of codebooks, and only a subfield needs to be replaced with a field.

First, a codebook is determined by using the $1^{st}$ subfield in the L subfields. The codebook indicated by the $1^{st}$ subfield is determined from the first codebook set based on a value of the $1^{st}$ subfield, and the first codebook set includes a plurality of codebooks.

The first codebook set may be determined based on one or more of a quantity of antenna ports of the terminal device, a used waveform (which may be replaced with information indicating whether transform precoding is used), an uplink full-power transmission mode (ULFPTxMode), a codebook subset type (that is, a codebookSubset type), and a maximum quantity of spatial streams for uplink transmission (for example, a maximum rank value for uplink transmission that is configured by the network device). The used waveform may be a cyclic prefixed orthogonal frequency division multiplexing (CP-OFDM) waveform or a discrete Fourier transform spread orthogonal frequency division multiplexing (DFT-S-OFDM) waveform. When the DFT-S-OFDM waveform is used, transform precoding is used. Therefore, the used waveform may alternatively be replaced with the information indicating whether transform precoding is used.

In some embodiments, the first codebook set may be considered as a codebook list (a first codebook list), and the first codebook list may be one of a plurality of preset codebook lists in a protocol. Each of the plurality of preset codebook lists in the protocol may include a plurality of codebooks, and the plurality of codebooks may have a same quantity of layers or different quantities of layers. Specific content and a format of the codebook list are not limited in this application. The terminal device may determine the first codebook list from the plurality of preset codebook lists in the protocol based on one or more parameters of the quantity of antenna ports of the terminal device, the used waveform (which may be replaced with the information indicating whether transform precoding is used), the uplink full-power transmission mode, the codebook subset type, and the maximum quantity of spatial streams for uplink transmission. For example, when the quantity of antenna ports of the terminal device is 2, transform precoding is not enabled, the maximum rank value for uplink transmission is 2, the uplink full-power transmission mode is not configured or is configured as a mode 2, and the codebookSubset type is fullyAndPartialAndNonCoherent, the first codebook list may be Table 3.

TABLE 3

| Bit field mapped to index | codebookSubset = fullyAndPartialAndNonCoherent |
|---|---|
| 0 | 1 layer: TPMI = 0 |
| 1 | 1 layer: TPMI = 1 |
| 2 | 2 layers: TPMI = 0 |
| 3 | 1 layer: TPMI = 2 |
| 4 | 1 layer: TPMI = 3 |
| 5 | 1 layer: TPMI = 4 |
| 6 | 1 layer: TPMI = 5 |
| 7 | 2 layers: TPMI = 1 |
| 8 | 2 layers: TPMI = 2 |
| 9 to 15 | Reserved |

After determining the first codebook set, the terminal device may determine a length (a quantity of bits) of the $1^{st}$ subfield based on a quantity of codebooks included in the first codebook set. In other words, the length of the $1^{st}$ subfield is determined based on the quantity of codebooks included in the first codebook set. For example, the first codebook set is the first codebook list. The length of the $1^{st}$ subfield is related to a quantity X of entries in the first codebook list. For example, the length of the $1^{st}$ subfield may be equal to $\lceil \log_2 X \rceil$ bits. Specially, when X=1, the length of the $1^{st}$ subfield may be 0.

After determining the length of the $1^{st}$ subfield, the terminal device may read a value of the $1^{st}$ subfield, and search the first codebook list based on the value of the $1^{st}$ subfield, to determine a codebook. When the value indicated by the $1^{st}$ subfield is P, it indicates that a $(p+1)^{th}$ codebook in the second codebook set is used.

For example, when the first codebook list is Table 3, the quantity X of entries in Table 3 is equal to 9, and the length of the $1^{st}$ subfield may be $\lceil \log_2 9 \rceil = 4$ (bits). When a value of 4 bits corresponding to the $1^{st}$ subfield is 2 (that is, 0010), it indicates that the $(2+1=3)^{rd}$ entry (an entry whose index is 2) in Table 3, that is, 2 layers: TPMI=0, that is, a codebook whose quantity of layers is 2 and that is numbered 0, is used.

After determining the codebook corresponding to the $1^{st}$ subfield, the terminal device determines codebooks corresponding to L−1 remaining subfields other than the $1^{st}$ subfield in the L subfields. A codebook indicated by an $i^{th}$ subfield in the L subfields is determined from the second codebook set based on a value of the $i^{th}$ subfield, where i is an integer greater than or equal to 2.

The second codebook set may be a subset of the first codebook set. For example, the second codebook set may include a codebook whose quantity of codebook layers is Q in the first codebook set, where Q is a quantity of layers of the codebook indicated by the $1^{st}$ subfield in the plurality of subfields, and Q is an integer greater than or equal to 1. Alternatively, the second codebook set is a set including a codebook whose quantity of layers is Q and that is determined based on one or more of parameters such as the quantity of antenna ports of the terminal device, the used waveform (which may be replaced with the information indicating whether transform precoding is used), the used uplink full-power transmission mode (ULFPTxMode), the used codebook subset type (codebookSubset), the maximum quantity of spatial streams for uplink transmission, a number of a corresponding subfield, and information indicating whether the corresponding subfield is the $1^{st}$ subfield.

In this embodiment of this application, a quantity of layers of the codebook indicated by each of the L subfields may be equal, for example, Q. In this case, the terminal device may determine, by using the quantity of layers of the codebook indicated by the $1^{st}$ subfield, quantities of layers of the codebooks indicated by the L−1 remaining subfields, so that a length of a subsequent subfield can be reduced, thereby reducing signaling overheads.

After determining the second codebook set, the terminal device may determine a length (a quantity of bits) of the $i^{th}$ subfield based on a quantity of codebooks included in the second codebook set. In other words, the length of the $i^{th}$ subfield may be determined based on the quantity of codebooks included in the second codebook set. Assuming that the quantity of codebooks included in the second codebook set is Y, the length of the $i^{th}$ subfield may be equal to $\lceil \log_2 Y \rceil$ bits. In other words, lengths of the L−1 remaining subfields other than the $1^{st}$ subfield are equal. Specially, when Y=1, the length of the subfield may be 0.

Optionally, the length of the $i^{th}$ subfield may be directly determined by searching a table. For example, when the uplink full-power transmission mode is the mode 2 or the uplink full-power transmission mode is not configured, the length of the $i^{th}$ subfield may be determined based on Table 4. When the quantity of antenna ports of the terminal device is 4, transform precoding is not enabled (that is, transform precoding disabled), the used codebookSubset type is fullyAndPartialAndNonCoherent, and the quantity Q of layers determined by the $1^{st}$ subfield is equal to 1, the length of the $i^{th}$ subfield is 5 bits. Specially, in Table 4, when the quantity of antenna ports is 4, transform precoding is not enabled, the used codebookSubset type is NonCoherent, and the quantity Q of layers determined by the $1^{st}$ subfield is equal to 4, there is only one possible codebook. In this case, the length of the $i^{th}$ subfield is 0, that is, the first field includes only one subfield, namely, the $1^{st}$ subfield. It should be understood that a value shown in Table 4 is merely an example, and an actual value may be the value in the table plus/minus an integer, for example, plus/minus 1. This is not limited in this application.

TABLE 4

| Antenna port | codebookSubset = fullyAndPartialAndNonCoherent | codebookSubset = partialAndNonCoherent | codebookSubset = noncoherent |
|---|---|---|---|
| Transform precoding disabled | | | |
| 4 ports | Quantity Q of layers = 1: 5 bits<br>Quantity Q of layers = 2: 5 bits<br>Quantity Q of layers = 3: 3 bits<br>Quantity Q of layers = 4: 3 bits | Quantity Q of layers = 1: 4 bits<br>Quantity Q of layers = 2: 4 bits<br>Quantity Q of layers = 3: 2 bits<br>Quantity Q of layers = 4: 2 bits | Quantity Q of layers = 1: 2 bits<br>Quantity Q of layers = 2: 3 bits<br>Quantity Q of layers = 3: 0 bits<br>Quantity Q of layers = 4: 0 bits |
| 2 ports | Quantity Q of layers = 1: 3 bits<br>Quantity Q of layers = 2: 2 bits | | Quantity Q of layers = 1: 1 bit<br>Quantity Q of layers = 2: 0 bits |
| Transform precoding enabled | | | |
| 4 ports | Quantity Q of layers = 1: 5 bits | Quantity Q of layers = 1: 4 bits | Quantity Q of layers = 1: 2 bits |
| 2 ports | Quantity Q of layers = 1: 3 bits | | Quantity Q of layers = 1: 1 bit |

For another example, when the uplink full-power transmission mode is configured as a mode 1, the length of the $i^{th}$ subfield may be determined by using Table 5. When the quantity of antenna ports of the terminal device is 4, transform precoding is not enabled (that is, transform precoding disabled), the used codebookSubset type is PartialAndNonCoherent, and the quantity of layers determined by the $1^{st}$ subfield is 1, the length of the $i^{th}$ subfield is 4 bits. It should be understood that a value shown in Table 5 is merely an example, and an actual value may be the value in the table plus/minus an integer, for example, plus/minus 1. This is not limited in this application.

TABLE 5

| Antenna port | codebookSubset = partialAndNonCoherent | codebookSubset = nonCoherent |
|---|---|---|
| Transform precoding disabled | | |
| 4 ports | Quantity Q of layers = 1: 4 bits | Quantity Q of layers = 1: 3 bits |
| | Quantity Q of layers = 2: 4 bits | Quantity Q of layers = 2: 3 bits |
| | Quantity Q of layers = 3: 2 bits | Quantity Q of layers = 3: 1 bit |
| | Quantity Q of layers = 4: 2 bits | Quantity Q of layers = 4: 0 bits |
| 2 ports | | 1 layer: 2 bits |
| | | Quantity Q of layers = 1: 0 bits |
| Transform precoding enabled | | |
| 4 ports | Quantity Q of layers = 1: 4 bits | Quantity Q of layers = 1: 3 bits |
| 2 ports | | Quantity Q of layers = 1: 2 bits |

After determining the length of the $i^{th}$ subfield, the terminal device may read the value of the $i^{th}$ subfield, and determine the codebook from the second codebook set based on the value of the $i^{th}$ subfield. When the value indicated by the $i^{th}$ subfield is S, it indicates that an $(S+1)^{th}$ codebook in the second codebook set is used.

For example, if the first codebook set is Table 3, and the quantity of layers of the codebook indicated by the $1^{st}$ subfield is 2, the second codebook set includes a codebook whose quantity of layers is 2 in Table 3. In Table 3, a quantity Y of codebooks whose quantities of layers each are 2 is equal to 3, that is, the second codebook set includes three codebooks. Therefore, the terminal device may determine that the length of the $i^{th}$ subfield is $\lceil \log_2 3 \rceil = 2$ bits. If the value of the $i^{th}$ subfield is 1, it indicates that the $(1+1=2)^{nd}$ codebook in the second codebook set, that is, 2 layers: TPMI=1, that is, a codebook whose quantity of layers is 2 and that is numbered 1, is used.

In some other embodiments, the first information is carried in a first field, the first field is used to indicate a codebook whose quantity of layers is a, and the codebook whose quantity of layers is a is used to determine M codebooks whose quantities of layers each are b. a is an integer greater than or equal to 2, M is an integer greater than or equal to 2, b is an integer greater than or equal to 1, and a=M*b. The first field may be a precoding information and number of layers field in the DCI.

In other words, the first information may indicate a codebook with a larger quantity of (more) layers, and the codebook with the larger quantity of (more) layers may be divided into a plurality of codebooks with smaller quantities of (fewer) layers. Each codebook with a smaller quantity of layers may be used for one PUSCH transmission. For example, if the terminal device sends two SRS resources to the network device, after measuring the two SRS resources, the network device may determine a codebook whose quantity of layers is 4, and indicate the codebook to the terminal device. The terminal device may divide the codebook into two codebooks whose quantities of layers each are 2. Each of the two codebooks whose quantities of layers each are 2 corresponds to one SRS resource. The terminal device may perform PUSCH transmission based on one SRS resource and a corresponding codebook whose quantity of layers is 2. Alternatively, the terminal device may simultaneously perform PUSCH transmission based on the two SRS resources, namely, the codebooks corresponding to the two SRS resources, which is equivalent to performing PUSCH transmission by using the foregoing codebook whose quantity of layers is 4.

The following uses an example to describe how to divide a codebook with a larger quantity of layers into a plurality of codebooks with smaller quantities of layers. The terminal device may divide the codebook with the larger quantity of layers into columns, to divide the codebook into M submatrixes, where each submatrix is a codebook with a smaller quantity of layers. For example, in Formula (1), a 4-column (where a quantity of columns indicates a quantity of layers) codebook may be divided into two 2-column codebooks. A method for dividing a codebook into M submatrixes is evenly dividing all columns, that is, dividing an N-column codebook into M submatrixes, where each submatrix includes N/M columns. When N/M is not equal to an integer, a ceiling operation or a floor operation may be performed. In this case, quantities of columns of a plurality of submatrixes may not be equal. Alternatively, it may be specified that a quantity of columns of a codebook with a larger quantity of layers needs to be exactly divisible by M. For example, when M=2, a quantity of columns of the codebook indicated by the DCI needs to be an even number.

$$\begin{bmatrix} 1 & 2 & 3 & 4 \\ 2 & 3 & 4 & 5 \\ 3 & 4 & 5 & 6 \\ 4 & 5 & 6 & 7 \end{bmatrix} \rightarrow \begin{bmatrix} 1 & 2 \\ 2 & 3 \\ 3 & 4 \\ 4 & 5 \end{bmatrix} \text{and} \begin{bmatrix} 3 & 4 \\ 4 & 5 \\ 5 & 6 \\ 6 & 7 \end{bmatrix} \quad (1)$$

M may be a quantity of SRS resources in an SRS resource set whose configured usage is a codebook, or a quantity of SRS resources used for transmission of a same PUSCH. M may alternatively be determined in another manner. For example, a value of M may be indicated by using RRC/MAC CE/DCI signaling, or may be reported through a UE capability reporting process, or may be a value specified in a protocol, or may be a default value. The value/an upper limit of M may be any one of 1, 2, 3, 4, 5, 6, 7, 8, 12, or 16. A set including possible values of M may be {1, 2, 3, 4, 5, 6, 7, 8, 12, 16} or a subset thereof. If M is configured by using the RRC signaling, M may be a mandatory parameter or an optional parameter.

It should be understood that submatrixes (codebooks with smaller quantities of layers) may be separately associated with SRS resources, so that the terminal device can perform data transmission based on the submatrixes and the SRS resources associated with the submatrixes. Optionally, the submatrixes may be sequentially associated in ascending or descending order of SRS resource indexes. For example, an SRS resource with the smallest/largest index is associated with the $1^{st}$ submatrix (a submatrix whose corresponding quantity of columns is the smallest in an original codebook), an SRS resource with the second smallest/second largest index is associated with the $2^{nd}$ submatrix (a next submatrix of the submatrix whose corresponding quantity of columns is the smallest in the original codebook), and so on. Optionally, the submatrixes may be sequentially associated according to an SRS resource configuration sequence or a measurement time sequence. For example, the $1^{st}$ configured/sent SRS resource is associated with the $1^{st}$ submatrix (a submatrix whose corresponding quantity of columns is the smallest in an original codebook), the $2^{nd}$ configured/sent SRS resource is associated with the $2^{nd}$ submatrix (a submatrix whose corresponding quantity of columns is the second smallest in the original codebook), and so on.

In some other embodiments, the first information is carried in a first field, the first field is used to indicate a codebook set (codebook combination), and the codebook set includes one or more codebooks. Each field value of the first field corresponds to one codebook combination. The first field may be a precoding information and number of layers field in the DCI.

For example, it is assumed that the first field includes 3 bits, and the first field may include eight field values, which are respectively 000 to 111. 000 may correspond to a codebook combination 1, 001 may correspond to a codebook combination 2, and by analogy, 111 may correspond to a codebook combination 8.

In some other embodiments, one field (for example, the precoding information and number of layers field) may be used to indicate one codebook. The codebook is used when the terminal device performs PUSCH transmission by using any SRS resource. In other words, the codebook is used when the terminal device performs PUSCH transmission by using any beam.

In the foregoing embodiment, a method for indicating the plurality of codebooks by using the first information may be mandatory in a protocol, or may be optional in a protocol. For example, the network device may configure, by using RRC signaling, whether to support/use the foregoing method for indicating the plurality of codebooks. Alternatively, the terminal device may report, through a terminal capability reporting process, whether to support/use the foregoing method for indicating the plurality of codebooks by using the first information. For example, the terminal device may report that the terminal device supports using a plurality of beams/a plurality of SRS resources/a plurality of spatial relations/a plurality of TCI-states/a plurality of pieces of QCL information/a plurality of codebooks for the foregoing PUSCH transmission. Further, a specific manner in which the first information indicates the plurality of codebooks may be configured by using the RRC signaling, and may be any one of the foregoing manners in which the first information indicates the plurality of codebooks. Alternatively, a specific manner in which the first information indicates the plurality of codebooks may be reported through the terminal capability reporting process, or may be any one of the foregoing manners in which the first information indicates the plurality of codebooks.

In addition, the terminal device may determine a function of the first information based on a condition 1, that is, determine, based on the condition 1, whether the first information indicates a single codebook (one codebook) or a plurality of codebooks. If the condition 1 is met, the terminal device determines that the first information indicates a plurality of codebooks. Otherwise, the terminal device determines that the first information indicates only a single codebook. In other words, when the condition 1 is met, the terminal device determines that the first information is used to indicate the plurality of codebooks.

For example, if the condition 1 is met, the terminal device determines that the first field (for example, the precoding information and number of layers field) in the DCI includes a plurality of subfields, and each subfield is used to indicate one codebook, so that a plurality of codebooks can be determined. Otherwise, the terminal device determines that the first field includes only a single subfield, or a length of only one subfield (for example, the $1^{st}$ subfield) is not 0, so that only a single codebook can be determined. Alternatively, if the condition 1 is met, the terminal device may determine that the DCI includes a plurality of fields, and each field is used to indicate one codebook, so that a plurality of codebooks can be determined. Otherwise, the terminal device determines that only one field in the DCI is used to indicate one codebook, so that only a single codebook can be determined. Alternatively, if the condition 1 is met, the terminal device needs to divide a codebook with a larger quantity of layers that is indicated by the first field in the DCI into a plurality of codebooks with smaller quantities of layers, to determine a plurality of codebooks. Otherwise, the terminal device determines that an indicated codebook does not need to be segmented, to be specific, directly performs PUSCH transmission by using the indicated codebook. Alternatively, if the condition 1 is met, the terminal device may determine that the first field in the DCI indicates a codebook combination. Because the codebook combination may include a plurality of codebooks, the terminal device may determine the plurality of codebooks. Otherwise, the terminal device determines that the first field indicates a single codebook, and determines the single codebook.

The condition 1 may be any one or a combination of a condition a, a condition b, and a condition c. The combination may refer to obtaining an intersection set of the conditions. For example, the condition 1 may include the condition a and the condition b. The combination may alternatively refer to obtaining a union set of the conditions. For example, the condition 1 may include the condition a or the condition b.

Condition a: The network device indicates a plurality of beams/a plurality of SRS resources/a plurality of spatial relations/a plurality of TCI-states/a plurality of pieces of QCL information for PUSCH transmission. For example, a field (an SRS resource indicator field or a new data indicator field) in the DCI is used to indicate the plurality of SRS resources (for example, all SRS resources in an SRS resource set whose usage is a codebook).

Condition b: The network device explicitly or implicitly indicates to perform PUSCH transmission by using a plurality of codebooks. For example, a field (for example, an SRS resource indicator field or a new data indicator field) or some bits (for example, the $1^{st}$ bit in the precoding information and number of layers field) in the DCI are used to indicate that the plurality of codebooks are used.

Condition c: The network device indicates, by using RRC or DCI, that a PUSCH transmission mode is repeated PUSCH transmission based on a plurality of beams/a plurality of SRS resources/a plurality of spatial relations/a plurality of TCI-states/a plurality of pieces of QCL information. For example, PUSCHs are simultaneously transmitted by using a plurality of beams/a plurality of SRS resources/a plurality of spatial relations/a plurality of TCI-states/a plurality of pieces of QCL information, or PUSCHs are separately transmitted at a plurality of different time points by using a plurality of beams/a plurality of SRS resources/a plurality of spatial relations/a plurality of TCI-states/a plurality of pieces of QCL information. A beam/spatial relation/TCI-state for PUSCH transmission may be indirectly (implicitly) indicated by using an SRS resource. Therefore, multi-beam based PUSCH transmission may also be referred to as multi-SRS resource based PUSCH transmission.

In a possible design, a dedicated field may be used to indicate or enable the function of the first information, to be specific, indicate whether the first information indicates a single codebook or a plurality of codebooks (for example, two codebooks). The dedicated field may include Z bits, where Z is an integer greater than or equal to 1. The dedicated field may be an independent field, for example, an independent field in the DCI. Alternatively, the dedicated field may be the first Z bits, the middle Z bits, or the last Z bits in a field (for example, the precoding information and number of layers field). This is not limited in this application. The Z bits may indicate one or both of the following information: a quantity N of codebooks indicated by the DCI (namely, the codebooks indicated by the first information); and information indicating whether the quantity of codebooks indicated by the DCI is greater than 1.

The terminal device may determine, based on the Z bits, the quantity of codebooks indicated by the DCI. For example, when Z=1 bit, a bit value 0 indicates that the DCI indicates only a single codebook, and a bit value 1 indicates that the DCI indicates a plurality of (for example, two) codebooks. Alternatively, a bit value 1 indicates that the DCI indicates only a single codebook, and a bit value 0 indicates that the DCI indicates a plurality of (for example, two) codebooks.

The foregoing codebook indication method for data transmission may be used for uplink transmission, downlink transmission, or sidelink transmission. Uplink transmission may be performed on both a common uplink and a supplementary uplink (SUL). In addition, the uplink transmission may be DCI scheduling based uplink transmission, or may be semi-persistent (SPS) uplink transmission or scheduling-free (configured-grant or grant-free) uplink transmission.

605: The terminal device performs data transmission based on the plurality of codebooks.

The terminal device performs a plurality of data transmissions (for example, PUSCH transmissions) based on the plurality of codebooks indicated by the first information and the plurality of SRS resources/beams corresponding to the plurality of codebooks. If the plurality of SRS resources/beams indicated by the network device are simultaneously used for transmission, the plurality of codebooks (the codebooks corresponding to the SRS resources/beams) are simultaneously used for transmission. If the plurality of SRS resources/beams indicated by the network device are used for separate transmission at different time points, one SRS resource/beam and a codebook corresponding to the SRS resource/beam are used in one transmission.

The plurality of PUSCH transmissions may correspond to a same RV or different RVs corresponding to a same TB or codeword, or correspond to different data streams corresponding to a same TB or codeword, or correspond to different TBs or codewords.

The plurality of PUSCH transmissions may be performed on a same time domain resource and different frequency domain resources. In other words, the plurality of PUSCH transmissions correspond to a same time domain resource and different frequency domain resources. The plurality of PUSCH transmissions may alternatively be performed on a same frequency domain resource and different time domain resources. In other words, the plurality of PUSCH transmissions correspond to a same frequency domain resource and different time domain resources. The plurality of PUSCH transmissions may alternatively be performed on a same time-frequency resource and different spatial domain resources (for example, antenna ports). In other words, the plurality of PUSCH transmissions correspond to a same time-frequency resource and different spatial domain resources. The plurality of PUSCH transmissions may alternatively be performed on different time domain resources and different frequency domain resources. In other words, the plurality of PUSCH transmissions correspond to different time domain resources and different frequency domain resources.

The plurality of PUSCH transmissions may correspond to a plurality of different SRS resources (or SRS resource combinations). The terminal device performs transmission based on a corresponding SRS resource, for example, performs transmission by using a transmit beam of the corresponding SRS resource. A quantity of SRS resources may be equal to a quantity of PUSCH transmissions. In this case, the plurality of PUSCH transmissions are in one-to-one correspondence with a plurality of SRS resources. The plurality of SRS resources correspond to the plurality of PUSCH transmissions according to an indicated sequence. For example, an $i^{th}$ SRS resource corresponds to an $i^{th}$ transmission. Alternatively, the plurality of SRS resources correspond to the plurality of PUSCH transmissions according to a sequence of indexes of the plurality of SRS resources. For example, an SRS resource whose index is the $i^{th}$ largest or the $i^{th}$ smallest corresponds to an $i^{th}$ transmission. Alternatively, a quantity of SRS resources may be less than a quantity of PUSCH transmissions. In this case, cyclic mapping may be performed according to the foregoing sequence. To be specific, when all the SRS resources are traversed according to the foregoing sequence, mapping is performed again starting from the $1^{st}$ SRS resource. For example, assuming that eight transmissions need to be performed, and only two SRS resources {1, 2} are indicated, SRS resources corresponding to the eight transmissions may be respectively 1, 2, 1, 2, 1, 2, 1, and 2. The plurality of SRS resources may alternatively correspond to different frequency domain/time domain/spatial domain/time-frequency resources. In other words, each SRS resource corresponds to one group of frequency domain/time domain/spatial domain/time-frequency resources. A specific correspondence may use the foregoing correspondence between an SRS resource and PUSCH transmission, provided that the $i^{th}$ transmission is replaced with an $i^{th}$ group of time domain resources/frequency domain resources/spatial domain resources/time-frequency resources. The $i^{th}$ group of time domain resources/frequency domain resources/spatial domain resources/time-frequency resources may be a time domain resource/frequency domain resource/spatial domain resource/time-frequency resource corresponding to the $i^{th}$ transmission.

The plurality of PUSCH transmissions may correspond to a plurality of different codebooks, and the terminal device performs transmission based on a corresponding codebook (that is, precodes to-be-sent data by using the corresponding codebook). A quantity of codebooks may be equal to a quantity of PUSCH transmissions. In other words, the plurality of PUSCH transmissions are in one-to-one correspondence with the plurality of codebooks. The plurality of codebooks may correspond to the plurality of PUSCH transmissions according to an indicated sequence. For example, an $i^{th}$ codebook corresponds to the $i^{th}$ transmission. Alternatively, the plurality of codebooks correspond to the plurality of PUSCH transmissions according to a sequence of indexes of the plurality of codebooks. For example, a codebook whose index is the $i^{th}$ largest or the $i^{th}$ smallest corresponds to the $i^{th}$ transmission. Alternatively, a quantity of codebooks may be less than a quantity of PUSCH transmissions. In this case, cyclic mapping may be performed according to the foregoing sequence. To be specific, when all the codebooks are traversed according to the foregoing sequence, mapping is performed again starting from the $1^{st}$ codebook. For example, assuming that eight transmissions need to be performed, and only two codebooks {1, 2} are indicated, codebooks corresponding to the eight transmissions may be respectively 1, 2, 1, 2, 1, 2, 1, and 2. The plurality of codebooks may alternatively correspond to different frequency domain/time domain/spatial domain/time-frequency resources. In other words, each codebook corresponds to one group of frequency domain/time domain/spatial domain/time-frequency resources. A specific correspondence may use the foregoing correspondence between a codebook and PUSCH transmission, provided that the $i^{th}$ transmission is replaced with an $i^{th}$ group of time domain resources/frequency domain resources/spatial domain resources/time-frequency resources. The $i^{th}$ group of time domain resources/frequency domain resources/spatial domain resources/time-frequency resources may be a time domain resource/frequency domain resource/spatial domain resource/time-frequency resource corresponding to the $i^{th}$ transmission. The plurality of codebooks may alternatively correspond to different SRS resources or different SRS resource combinations. In other words, each codebook corresponds to one SRS resource or one group of SRS resources. A specific correspondence may use the foregoing correspondence between a codebook and PUSCH transmission, provided that the $i^{th}$ transmission is replaced with an $i^{th}$ SRS resource or an $i^{th}$ group of SRS resources. The $i^{th}$ SRS resource or the $i^{th}$ group of SRS resources may be an SRS resource corresponding to the $i^{th}$ transmission.

For any one of the foregoing PUSCH transmission modes, the terminal device may report, through the terminal capability reporting process, whether to support the PUSCH transmission mode, or report, through the terminal capability reporting process, a PUSCH transmission mode specifically supported by the terminal device.

In this embodiment of this application, the network device may indicate the plurality of codebooks to the terminal device by using the first information, that is, a quantity of codebooks indicated by the network device is extended, so that the terminal device can perform multi-beam based data transmission based on the plurality of codebooks indicated by the first information.

The plurality of codebooks indicated by the first information may have the same quantity of layers. In this way, after a quantity of layers of one of the plurality of codebooks is determined, a quantity of layers of another codebook is determined accordingly, thereby reducing signaling overheads for indicating the plurality of codebooks.

Figure 7:
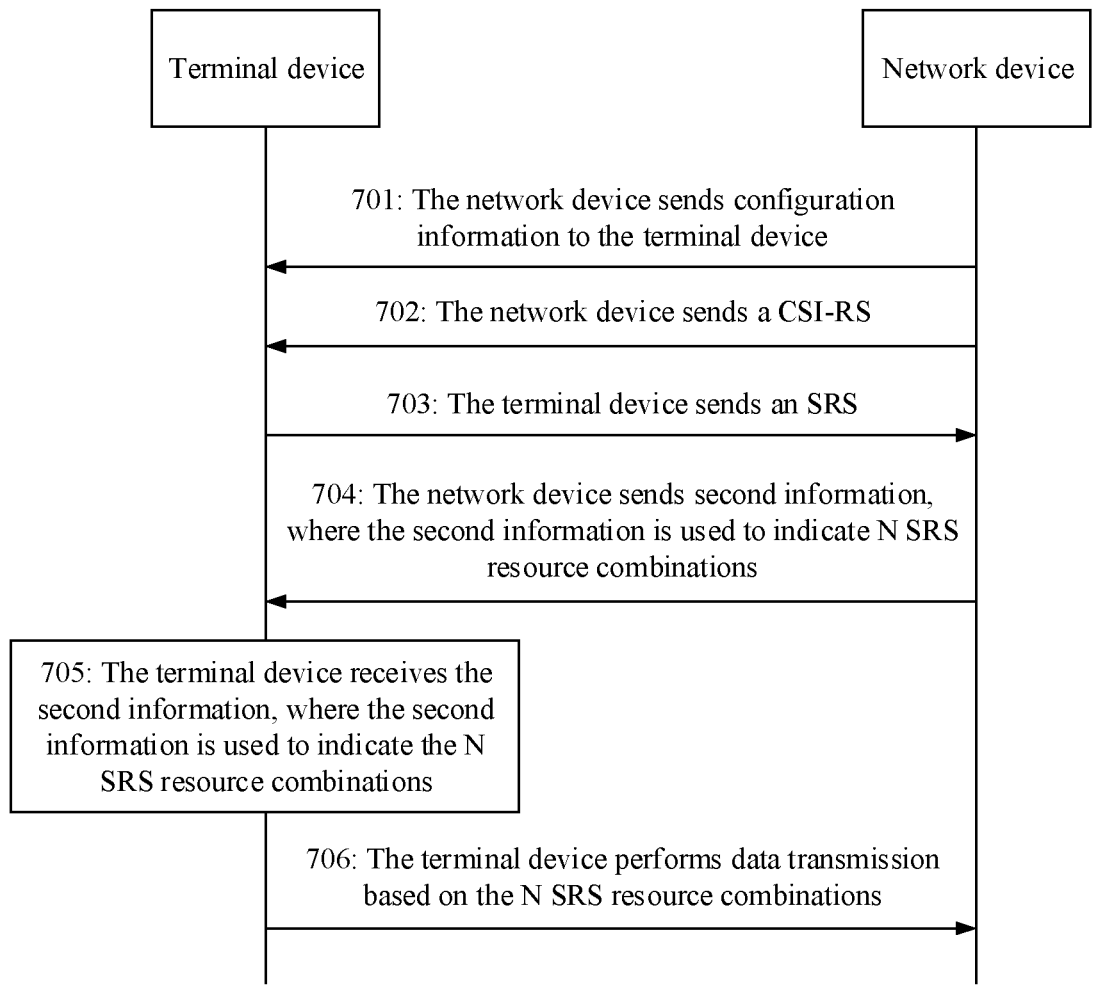
FIG. 7 is another schematic diagram of signal exchange to which a data transmission method is applicable according to an embodiment of this application.

As shown in FIG. 7, an embodiment of this application provides another data transmission method, including the following steps.

701. A network device sends configuration information to a terminal device.

The network device may configure, for the terminal device by using the configuration information, one or more SRS resource sets whose usage is a non-codebook and an associated CSI-RS for channel measurement. The configuration information may be determined by the network device based on information reported by the terminal device. The information reported by the terminal device may include one or more of the following parameters: information indicating whether to support configuration of a plurality of (for example, two) SRS resource sets whose usage is a non-codebook, a quantity of SRS resource sets whose configurable usage is a non-codebook, a quantity of SRS resources that can be included in one SRS resource set whose usage is a non-codebook, a quantity of CSI-RS resources that can be associated with one SRS resource set whose usage is a non-codebook, information indicating whether one SRS resource set whose usage is a non-codebook can be associated with a plurality of (for example, two) CSI-RS resources, information indicating whether a plurality of (for example, two) CSI-RS resources associated with a non-codebook SRS resource set can be configured, and a quantity of CSI-RS resources associated with the non-codebook SRS resource set.

The configuration information may be used to configure one SRS resource set and one CSI-RS resource, the SRS resource set includes K SRS resource subsets, the CSI-RS resource includes K antenna port combinations, and the K SRS resource subsets are in one-to-one correspondence with the K antenna port combinations, where K is an integer greater than or equal to 1. Alternatively, the configuration information may be used to configure one SRS resource set and K CSI-RS resources, the SRS resource set includes K SRS resource subsets, and the K SRS resource subsets are in one-to-one correspondence with the K CSI-RS resources. Alternatively, the configuration information may be used to configure K SRS resource sets and one CSI-RS resource, the CSI-RS resource includes K antenna ports, and the K antenna ports are in one-to-one correspondence with the K SRS resource sets. Alternatively, the configuration information may be used to configure K SRS resource sets and K CSI-RS resources, and the K CSI-RS resources are in one-to-one correspondence with the K SRS resource sets.

The following separately describes different cases of the configuration information.

Case 1: The configuration information is used to configure one SRS resource set and one CSI-RS resource. Usage of the SRS resource set is a non-codebook. The SRS resource set includes one or more SRS resources. The CSI-RS resource may include one or more ports, and each port corresponds to one reference signal.

In an implementation, the ports of the CSI-RS resource may be divided into K port subsets. Each port subset corresponds to a different beam/a different TCI-state/different QCL information/a different spatial relation/a different SRS resource. For example, K TCI-states/K pieces of QCL information may be configured for the CSI-RS resource, which correspond to the K port subsets. For each port subset, the network device sends, by using a corresponding beam/a corresponding TCI-state/corresponding QCL information, a reference signal corresponding to the port subset.

Optionally, the SRS resources in the SRS resource set are also divided into K SRS resource subsets, which correspond to the K port subsets of the CSI-RS resource. A receive beam corresponding to each port subset may be used to determine a transmit beam of a corresponding SRS resource subset. For example, a TCI-state/QCL information corresponding to each port subset is used to determine a spatial relation/a TCI-state/QCL information of the corresponding SRS resource subset. Alternatively, a transmit beam of an SRS resource subset may be used to determine a receive beam of a corresponding port subset. For example, a spatial relation/a TCI-state/QCL information of the SRS resource subset may be used to determine a TCI-state/QCL information of the corresponding port subset. Each SRS resource subset may include an equal/a same quantity of resources. Each port subset may include an equal/a same quantity of ports. A quantity of resources included in each SRS resource subset/ an upper limit of the quantity of resources included in each SRS resource subset may be equal to/the same as a quantity of ports included in each port subset/an upper limit of the quantity of ports included in each port subset. Spatial relations/TCI-states/QCL information of SRS resources in one SRS resource subset may be equal/the same.

Case 2: The configuration information is used to configure one SRS resource set and K CSI-RS resources. Usage of the SRS resource set is a non-codebook. The SRS resource set includes one or more SRS resources. The CSI-RS resource may include one or more ports, and each port corresponds to one reference signal.

In an implementation, the SRS resources in the SRS resource set may be divided into K SRS resource subsets, which correspond to K CSI-RS resources. A receive beam of each CSI-RS resource may be used to determine a transmit beam of a corresponding SRS resource subset. For example, a TCI-state/QCL information corresponding to each CSI-RS resource is used to determine a spatial relation/a TCI-state/ QCL information of the corresponding SRS resource subset. Alternatively, a transmit beam of an SRS resource subset may be used to determine a receive beam of a corresponding CSI-RS resource. For example, a spatial relation/a TCI-state/QCL information of the SRS resource subset may be used to determine a TCI-state/QCL information of the corresponding CSI-RS resource. Optionally, a quantity of resources included in each SRS resource subset/an upper limit of the quantity of resources included in each SRS resource subset may be equal. The quantity of resources in each SRS resource subset/the upper limit of the quantity of resources in each SRS resource subset may be equal to a quantity of ports of the corresponding CSI-RS resource. Spatial relations/TCI-states/QCL information of SRS resources in one SRS resource subset may also be equal.

In another implementation, the SRS resources do not need to be divided into K subsets. Each CSI-RS resource may be associated with all the SRS resources in the SRS resource set, that is, each CSI-RS resource corresponds to the entire SRS resource set.

Case 3: The configuration information is used to configure K SRS resource sets and one CSI-RS resource. Usage of the SRS resource set is a non-codebook. The SRS resource set includes one or more SRS resources. The CSI-RS resource may include one or more ports, and each port corresponds to one reference signal.

In an implementation, the ports of the CSI-RS resource may be divided into K port subsets, which correspond to K SRS resource sets. Each port subset may correspond to a different beam/a different TCI-state/different QCL information/a different spatial relation. For example, K TCI-states/K pieces of QCL information may be configured for one CSI-RS resource, which correspond to the K port subsets. For each port subset, the network device sends, by using a beam/a TCI-state/QCL information corresponding to the port subset, a reference signal corresponding to the port subset. A receive beam corresponding to each port subset may be used to determine a transmit beam of an SRS resource in a corresponding SRS resource set. For example, a TCI-state/QCL information corresponding to each port subset may be used to determine a spatial relation/a TCI-state/QCL information of the SRS resource in the corresponding SRS resource set. Alternatively, a transmit beam of an SRS resource in each SRS resource set may be used to determine a receive beam of a corresponding port subset. For example, a spatial relation/a TCI-state/QCL information of the SRS resource in each SRS resource set is used to determine a TCI-state/QCL information of the corresponding port subset. Each SRS resource set may include an equal quantity of SRS resources. Each port subset may include an equal quantity of ports. The quantity of resources included in each SRS resource set may be equal to the quantity of ports included in each port subset. Spatial relations/TCI-states/QCL information of SRS resources in one SRS resource set whose usage is a non-codebook may be equal.

Case 4: The configuration information is used to configure K SRS resource sets and K CSI-RS resources. Usage of the SRS resource set is a non-codebook. The SRS resource set includes one or more SRS resources. The CSI-RS resource may include one or more ports, and each port corresponds to one reference signal.

In an implementation, the K CSI-RS resources are associated with the K SRS resource sets in a one-to-one manner. A receive beam of each CSI-RS resource may be used to determine a transmit beam of an SRS resource in a corresponding SRS resource set. For example, a TCI-state/QCL information of each CSI-RS resource may be used to determine a spatial relation/a TCI-state/QCL information of the SRS resource in the corresponding SRS resource set. Alternatively, a transmit beam of an SRS resource in each SRS resource set may be used to determine a receive beam of a corresponding CSI-RS resource. For example, a spatial relation/a TCI-state/QCL information of the SRS resource in each SRS resource set is used to determine a TCI-state/QCL information of the corresponding CSI-RS resource.

For both Case 2 and Case 4, the K CSI-RS resources are configured by using the configuration information. The terminal device may separately measure the K CSI-RS resources, to obtain channel information corresponding to each resource. For example, each CSI-RS resource corresponds to one beam, and the channel information of each beam may be obtained by measuring each CSI-RS resource. Alternatively, the terminal device may jointly measure the K CSI-RS resources, that is, measure a channel including the K CSI-RS resources. For example, two CSI-RS resources are configured, and each CSI-RS resource includes two ports. The terminal device may jointly measure the two CSI-RS resources, to measure a channel including four ports in total. The terminal device may determine, based on a specific condition, how to measure the K CSI-RS resources.

In one manner, determining is performed based on a quantity of configured CSI-RS resources and a quantity of corresponding SRS resource sets. For example, when K (K>1) CSI-RS resources are associated with a same SRS resource set whose usage is a non-codebook, the terminal device needs to jointly measure the K CSI-RS resources. When each of K (K>1) CSI-RS resources is associated with one SRS resource set whose usage is a non-codebook, the terminal device measures each CSI-RS resource.

A value/an upper limit of K may be indicated by using RRC signaling/MAC CE signaling/DCI signaling, or reported through a terminal device capability reporting process, or specified in a protocol, or use a default value. The value/the upper limit of K may be any one of 1, 2, 3, 4, 5, 6, 7, 8, 12, or 16. A value range of K may be {1, 2, 3, 4, 5, 6, 7, 8, 12, 16} or a subset thereof. If the value of K is configured by using the RRC signaling, K may be a mandatory parameter or an optional parameter. This is not limited in this application.

It should be understood that the SRS resource set and the CSI-RS resource are used after being activated. For example, when a plurality of SRS resource sets (for example, SRS resource sets whose types are semi-persistent) are configured, and only some SRS resource sets are activated, only the some activated SRS resource sets are used for data transmission. The configured SRS resource set may be activated and deactivated by using dedicated signaling. In an implementation, corresponding SRS resources or SRS resource sets may be separately configured for a plurality of antenna panels of the terminal device. When an antenna panel is turned off, an SRS resource or an SRS resource set corresponding to the antenna panel is automatically deactivated. That the antenna panel is turned off may be that the terminal device sends signaling including an antenna panel turn-off notification to the network device, where the signaling includes an index of the antenna panel that is turned off. Alternatively, that the antenna panel is turned off may be that the network device sends signaling that includes an antenna panel turn-off notification to the terminal device, where the signaling includes an index of the antenna panel that is turned off.

When an antenna panel is turned on, an SRS resource or an SRS resource set corresponding to the antenna panel is automatically activated. That the antenna panel is turned on may be that the terminal device sends signaling including an antenna panel turn-on notification to the network device, where the signaling includes an index of the antenna panel that is turned on. Alternatively, that the antenna panel is turned on may be that the network device sends signaling that includes an antenna panel turn-on notification to the terminal device, where the signaling includes an index of the antenna panel that is turned on. The index of the antenna panel may be a dedicated index, for example, a panel ID/index, or may be another index, for example, an antenna ID, an antenna port ID, an antenna group ID, an antenna port group ID, an RS ID, an RS set ID, an RS setting ID, a TCI-state ID, a beam ID, a UL TCI-state ID, or a spatial relation ID. An RS may be an SRS, a CSI-RS, a cell reference signal (CRS), a synchronization signal block (SSB), a tracking reference signal (TRS), a phase tracking reference signal (PTRS), a demodulation reference signal (DMRS), or the like.

702: The network device sends a CSI-RS.

The network device sends the CSI-RS to the terminal device based on the CSI-RS resource in the configuration information.

703: The terminal device sends an SRS.

The terminal device measures the CSI-RS that is sent by the network device on the CSI-RS resource, and determines one or more codebooks for uplink transmission based on a measurement result. The terminal device sends the SRS to the network device based on the one or more determined codebooks and the SRS resource in the configuration information. To be specific, the terminal device may send one or more groups of SRSs to the network device, where each group of SRSs may correspond to one group of SRS resources (where for example, one SRS corresponds to one SRS resource) and is sent by using one codebook.

In an implementation, if the network device configures/activates one SRS resource set whose usage is a non-codebook, it may be limited that each group of SRS resources sent by the terminal device is a combination of SRS resources in the SRS resource set.

In another implementation, if the network device configures/activates a plurality of SRS resource sets whose usage is a non-codebook, it may be limited that each group of SRS resources sent by the terminal device is a combination of SRS resources in a same SRS resource set. To be specific, a same group of SRS resources belong to a same SRS resource set. Different groups of SRS resources belong to different SRS resource sets.

In still another implementation, if the network device configures/activates one SRS resource set whose usage is a non-codebook, and the SRS resource set is divided into a plurality of SRS resource subsets, it may be limited that each group of SRS resources sent by the terminal device is a combination of SRS resources in a same SRS resource subset. To be specific, a same group of SRS resources belong to a same SRS resource subset. Different groups of SRS resources belong to different SRS resource subsets.

704: The network device sends second information, where the second information is used to indicate N SRS resource combinations, where N is an integer greater than or equal to 1.

The network device measures the SRS that is sent by the terminal device on the SRS resource, and determines, based on a measurement result, one or more (for example, N) SRS resource combinations with higher reliability. The network device may send the second information to the terminal device, where the second information is used to indicate the N SRS resource combinations. Each group of SRS resources (that is, each SRS resource combination) may include one or more SRS resources. For example, the second information may be carried in DCI, to be specific, the network device may indicate the N SRS resource combinations by using the DCI. The network device may alternatively indicate the N SRS resource combinations by using other signaling, for example, MAC CE signaling or RRC signaling. This is not limited in this application.

705: The terminal device receives the second information, where the second information is used to indicate the N SRS resource combinations.

In a possible design, each of the N SRS resource combinations has an equal quantity of SRS resources. In this way, the terminal device may determine, based on a quantity of SRS resources in one of the SRS resource combinations, a quantity of SRS resources in a remaining SRS resource combination, thereby reducing signaling overheads for indicating the quantity of SRS resources in the remaining SRS resource combination.

In a possible design, the N SRS resource combinations include a first SRS resource combination and a second SRS resource combination, the first SRS resource combination is determined from a first set, the second SRS resource combination is determined from a second set, and the second set is a subset of the first set. Optionally, the second set may be a proper subset of the first set. In this way, a quantity of bits used to indicate the first SRS resource combination may be less than a quantity of bits used to indicate the second SRS resource combination, thereby reducing signaling consumption.

In some embodiments, the second information is carried in a second field, the second field may include a plurality of (for example, N) subfields, and each subfield is used to indicate one SRS resource combination. The subfield refers to some bits in the second field, that is, one or more bits in the second field may be considered as one subfield. For example, the second field may be an SRI field in the DCI. Alternatively, the second information may be carried in a plurality of (for example, N) fields, and each field is used to determine one SRS resource combination.

The following describes a method for determining a plurality of codebooks by using an example in which first information is carried in a plurality of subfields (for example, L subfields) in a first field. It should be understood that a subfield in the following method may alternatively be replaced with a field. N may be a quantity of configured/activated SRS resource sets whose usage is a non-codebook. Alternatively, N may be indicated by using RRC/MAC CE/DCI signaling, or N may be reported through a UE capability reporting process, or N may be specified in a protocol, or N may use a default value. A value/an upper limit of N may be any one of 1, 2, 3, 4, 5, 6, 7, 8, 12, or 16. A value range of N may be {1, 2, 3, 4, 5, 6, 7, 8, 12, 16} or a subset thereof. If N is configured by using the RRC signaling, N may be a mandatory parameter or an optional parameter. This is not limited in this application.

In an implementation, if the network device configures/activates one SRS resource set whose usage is a non-codebook, all the N subfields correspond to the SRS resource set. In other words, the SRS resource combination indicated by each subfield is an SRS resource in the SRS resource set.

In another implementation, if the network device configures/activates a plurality of SRS resource sets whose usage is a non-codebook, the N subfields are in one-to-one correspondence with the plurality of SRS resource sets. The SRS resource combination indicated by each subfield is an SRS resource in an SRS resource set corresponding to the subfield. For example, if an $i^{th}$ subfield corresponds to an $i^{th}$ SRS resource set, an SRS resource combination indicated by the $i^{th}$ subfield is an SRS resource in the $i^{th}$ SRS resource set. i is an integer greater than or equal to 1, and the $i^{th}$ SRS resource set may be an SRS resource set whose index is the $i^{th}$ smallest or the $i^{th}$ largest, or an $i^{th}$ configured/activated SRS resource set.

In still another implementation, if the network device configures/activates one SRS resource set whose usage is a non-codebook, and the SRS resource set is divided into N SRS resource subsets, the N subfields are in one-to-one correspondence with the N SRS resource subsets. The SRS resource combination indicated by each subfield is an SRS resource in an SRS resource subset corresponding to the subfield. For example, if an $i^{th}$ subfield corresponds to an $i^{th}$ SRS resource subset, an SRS resource combination indicated by the $i^{th}$ subfield is an SRS resource in the $i^{th}$ SRS resource subset.

The N SRS resource combinations meet one or more of the following constraints: Constraint 1: A quantity of SRS resources included in each of the N SRS resource combinations is less than or equal to a first preset threshold, where the first preset threshold may be 1, 2, 3, 4, or the like. Constraint 2: A total quantity of SRS resources included in the N SRS resource combinations is less than or equal to a second preset threshold, where the second preset threshold may be 2, 3, 4, or the like. Constraint 3: Each of the N SRS resource combinations corresponds to (belongs to) one SRS resource set/SRS resource subset, and the SRS resource combinations correspond to different SRS resource sets/SRS resource subsets. In other words, SRS resources belonging to a same SRS resource set/SRS resource subset may form one SRS resource combination. Constraint 4: Each of the N SRS resource combinations includes an equal quantity of SRS resources. For example, each of the SRS resource combinations includes one SRS resource, two SRS resources, or three SRS resources.

The following describes a method for determining the N SRS resource combinations by using an example in which the N subfields are used to indicate the N SRS resource combinations. It should be understood that the following method is also applicable to a case in which a plurality of fields are used to indicate the N SRS resource combinations, and a subfield may be replaced with a field.

First, one SRS resource combination may be determined based on a value of the $1^{st}$ subfield in the N subfields. The SRS resource combination indicated by the $1^{st}$ subfield is determined from the first set based on the value of the $1^{st}$ subfield, and the first set includes a plurality of SRS resource combinations.

The first set may be determined based on a maximum quantity of spatial streams for uplink transmission (for example, a maximum quantity of spatial streams for uplink transmission that is configured by the network device) and/or a quantity of SRS resources corresponding to the $1^{st}$ subfield. The SRS resource corresponding to the $1^{st}$ subfield includes any one of the following: a configured or activated SRS resource set used for non-codebook based uplink transmission; an SRS resource set that corresponds to the $1^{st}$ subfield and that is used for non-codebook based uplink transmission; and an SRS resource subset corresponding to the $1^{st}$ subfield in the configured or activated SRS resource set used for non-codebook based uplink transmission.

In some embodiments, the first set may be considered as an SRS resource list (a first SRS resource list). The first SRS resource list may be one of a plurality of preset SRS resource lists in a protocol. Each of the plurality of preset SRS resource lists in the protocol may include a plurality of SRS resources. The terminal device may determine the first SRS resource list from the plurality of preset SRS resource lists in the protocol based on parameters such as a maximum rank value that can be used for PUSCH transmission and the quantity of SRS resources corresponding to the $1^{st}$ subfield. For example, when the maximum rank value that can be used for PUSCH transmission is 2, and the quantity of SRS resources corresponding to the $1^{st}$ subfield is 3, the first SRS resource list may be Table 6.

TABLE 6

| Bit field mapped to index | SRI(s), $N_{SRS}$ = 3 |
| --- | --- |
| 0 | 0 |
| 1 | 1 |
| 2 | 2 |
| 3 | 0, 1 |
| 4 | 0, 2 |
| 5 | 1, 2 |
| 6 and 7 | Reserved |

After determining the first set, the terminal device may determine a length (a quantity of bits) of the $1^{st}$ subfield based on a quantity X of SRS resource combinations included in the first set. In other words, the length of the $1^{st}$ subfield is determined based on the quantity X of SRS resource combinations included in the first set. For example, the length of the $1^{st}$ subfield is equal to $\lceil \log_2 X \rceil$ bits. For example, when the first set (the first SRS resource list) is Table 6, the length of the $1^{st}$ subfield is $\lceil \log_2 6 \rceil = 3$ bits. X may be the quantity of SRS resource combinations included in the first SRS resource list. Alternatively, X may be a quantity of SRS resource combinations that are generated based on the SRS resource corresponding to the $1^{st}$ subfield, and the quantity does not exceed a limited quantity (that is, the maximum rank value that can be used for PUSCH transmission). For example, $$X = \sum_{i=1}^{min\{L_{max}, N_{SRS}\}} \binom{N_{SRS}}{i}.$$

$L_{max}$ is the maximum rank value that can be used for PUSCH transmission, and $N_{sRs}$ is the quantity of SRS resources corresponding to the $1^{st}$ subfield.

After determining the length of the $1^{st}$ subfield, the terminal device may read the value of the $1^{st}$ subfield. When the field value of the $1^{st}$ subfield is T, it indicates that an SRS resource combination in a $(T+1)^{th}$ entry (or an entry whose index is i) in the first set (the first SRS resource list) is used. For example, when the value indicated by the $1^{st}$ subfield is 3, it indicates that an SRS resource combination in a $(3+1=4)^{th}$ entry (an entry whose index is 3) in the table is used, that is, two SRS resources whose indexes are 0 and 1 are used. An index is a number of an SRS resource in an SRS resource set.

Then, the terminal device determines SRS resource combinations corresponding to N−1 remaining subfields other than the $1^{st}$ subfield in the N subfields. An SRS resource combination indicated by $j^{th}$ subfield in the N subfields is determined from the second set based on a value of the $j^{th}$ subfield, and the second set may be a subset of the first set, where j is an integer greater than or equal to 2.

The second set may include an SRS resource combination that is in the first set and whose quantity of SRS resources is P, where P is a quantity of SRS resources included in the SRS resource combination indicated by the $1^{st}$ subfield, P is an integer greater than or equal to 1, and j is an integer greater than or equal to 2. Alternatively, the second set may include each SRS resource combination that includes P SRS resources and that is generated based on an SRS resource corresponding to the $j^{th}$ subfield. For example, assuming that SRS resources corresponding to the $j^{th}$ subfield include {0, 1, 2}, and P=2, the second set may include three SRS resource combinations, namely, {0, 1}, {0, 2}, and {1, 2}, and each SRS resource combination includes two SRS resources. An SRS resource in the SRS resource combination corresponding to the $j^{th}$ subfield may be an SRS resource in a configured/activated SRS resource set whose usage is a non-codebook, or an SRS resource in an SRS resource set corresponding to the $j^{th}$ subfield, or an SRS resource in an SRS resource subset corresponding to the $j^{th}$ subfield. Alternatively, the SRS resource combination included in the second set may be an SRS resource combination that is in the SRS resource combination used by the terminal device in step 703 and whose quantity of SRS resources is P. In other words, a length of the $j^{th}$ subfield and/or the SRS resource indicated by the $j^{th}$ subfield are/is determined, with reference to the quantity of SRS resources indicated by the $1^{st}$ subfield, based on a table that is determined based on one or more of parameters such as the maximum rank value that can be used for PUSCH transmission and a quantity of SRS resources corresponding to the $j^{th}$ subfield. In addition to the foregoing parameters, the table may be further determined with reference to another parameter, for example, a parameter such as a number of the $j^{th}$ subfield or information indicating whether the $j^{th}$ subfield is the $1^{st}$ subfield. In other words, for different subfields, different second sets may be determined.

For example, when the quantity P of SRS resources indicated by the $1^{st}$ subfield is equal to 1, the second set may be Table 7-1. When the quantity P of SRS resources indicated by the $1^{st}$ subfield is equal to 2, the second set may be Table 7-2. When the quantity P of SRS resources indicated by the $1^{st}$ subfield is equal to 3, the second set may be Table 7-3. A quantity of configured/activated SRS resources is the quantity of SRS resources corresponding to the $j^{th}$ subfield.

TABLE 7-1

Quantity P of SRS resources indicated by the $1^{st}$ subfield = 1

| Value of the $j^{th}$ subfield | Quantity of configured/ activated SRS resources = 2 | Quantity of configured/ activated SRS resources = 3 | Quantity of configured/ activated SRS resources = 4 |
|---|---|---|---|
| 0 | 0 | 0 | 0 |
| 1 | 1 | 1 | 1 |
| 2 |   | 2 | 2 |
| 3 |   | Reserved | 3 |

TABLE 7-2

Quantity P of SRS resources indicated by the $1^{st}$ subfield = 2

| Value of the $j^{th}$ subfield | Quantity of configured/activated SRS resources = 3 | Quantity of configured/activated SRS resources = 4 |
|---|---|---|
| 0 | 0, 1 | 0, 1 |
| 1 | 0, 2 | 0, 2 |
| 2 | 1, 2 | 0, 3 |
| 3 | Reserved | 1, 2 |
| 4 |   | 1, 3 |
| 5 |   | 2, 3 |

TABLE 7-3

| Quantity P of SRS resources indicated by the 1st subfield = 3 | |
| --- | --- |
| Value of the $j^{th}$ subfield | Quantity of configured/ activated SRS resources = 4 |
| 0 | 0, 1, 2 |
| 1 | 0, 1, 3 |
| 2 | 0, 2, 3 |
| 3 | 1, 2, 3 |

In this embodiment of this application, the SRS resource combination indicated by each of the N subfields includes an equal quantity of SRS resources. For example, each SRS resource combination includes P SRS resources. In this case, the terminal device may determine, by using the quantity of SRS resources indicated by the $1^{st}$ subfield, quantities of SRS resources corresponding to the N−1 remaining subfields, so that a length of a subsequent subfield can be reduced, thereby reducing signaling overheads.

The length of the $j^{th}$ subfield may be determined based on a quantity Y of SRS resource combinations included in the second set. For example, the length of the $j^{th}$ subfield is equal to $\lceil \log_2 Y \rceil$ bits. For example, when the second set is Table 7-2, and the quantity of SRS resources corresponding to the $j^{th}$ subfield is 4, Y=6 (that is, six SRS resource combinations are included), and the length of the $j^{th}$ subfield is $\lceil \log_2 6 \rceil = 3$. Optionally, the length of the $j^{th}$ subfield may be equal to $\lceil \log_2(Y-1) \rceil$, that is, the SRS resource combination already indicated by the $1^{st}$ subfield is excluded. In this way, the SRS resource combination indicated by the $j^{th}$ subfield is different from the SRS resource combination indicated by the $1^{st}$ subfield. Alternatively, the length of the $j^{th}$ subfield may be equal to $\lceil \log_2(Y-j+1) \rceil$, that is, an SRS resource combination already indicated by a subfield before the $j^{th}$ subfield is excluded. In this way, each subfield indicates a different SRS resource combination. Specially, when Y=1, the length of the $j^{th}$ subfield may be 0.

After determining the length of the $j^{th}$ subfield, the terminal device may read the value of the $j^{th}$ subfield, and determine the SRS resource combination from the second set based on the value of the $j^{th}$ subfield. For example, when the value of the $j^{th}$ subfield is T, it indicates that a $(T+1)^{th}$ SRS resource combination in the second set is used. For example, when the second set is Table 7-2, and the quantity of SRS resources corresponding to the $j^{th}$ subfield is equal to 4, if the value of the $j^{th}$ subfield is 2, it indicates that the $(2+1=3)^{rd}$ SRS resource combination, that is, {0, 3}, in Table 7-2 is used.

In some embodiments, the second information may be carried in a second field, and the second field is used to indicate the N SRS resource combinations. The second field may be, for example, an SRI field. Each of the N SRS resource combinations may belong to one SRS resource set or one SRS resource subset. Different SRS resource combinations belong to different SRS resource sets or different SRS resource subsets. Specifically, the following several cases may be included:

Case 1: The second field indicates one SRS resource combination, and SRS resources indicated by all field values of the second field belong to a same SRS resource set or a same SRS resource subset. For example, two SRS resource sets {1, 2} and {3, 4} whose usage is a non-codebook are configured/activated. Each field value of the second field can indicate only SRS resources that belong to a same SRS resource set, for example, {1}, {2}, {1, 2}, {3}, {4}, and {3, 4}, but cannot indicate SRS resources that belong to different SRS resource sets, for example, {1, 3}, and {1, 4}. It may be limited that all the field values of the second field indicate an SRS resource combination in an SRS resource set, for example, only an SRS resource combination in the $1^{st}$ SRS resource set, for example, {1}, {2}, or {1, 2}, but cannot indicate an SRS resource combination in the $2^{nd}$ SRS resource set, for example, {3}, {4}, or {3, 4}. It may be further limited that a quantity of SRS resources indicated by each field value does not exceed a specific threshold. The specific threshold may be the maximum rank value that can be used for PUSCH transmission, or a quantity of SRS resources in a corresponding SRS resource set, or the smaller one of the maximum rank value that can be used for PUSCH transmission and the quantity of SRS resources in the corresponding SRS resource set. The specific threshold may be specified in a protocol (where for example, it is specified that the specific threshold is equal to 2 or 4), indicated by the network device, or reported by the terminal device. This is not limited in this application.

Case 2: The second field indicates N SRS resource combinations, and SRS resources indicated by all field values of the second field belong to N (for example, two) SRS resource sets or N (for example, two) SRS resource subsets. For example, two SRS resource sets {1, 2} and {3, 4} whose usage is a non-codebook are configured/activated. An SRS resource combination indicated by each field value of the second field includes SRS resources in the foregoing two SRS resource sets. For example, assuming that the second field includes 2 bits, when the field value of the second field is 00, an SRS resource combination {1, 3} may be indicated, where an SRS resource 1 belongs to the SRS resource set {1, 2}, and an SRS resource 3 belongs to the SRS resource set {3, 4}. When the field value of the second field is 01, an SRS resource combination {1, 4} may be indicated, where an SRS resource 1 belongs to the SRS resource set {1, 2}, and an SRS resource 4 belongs to the SRS resource set {3, 4}. The second field may indicate all possible SRS resource combinations, for example, {1, 3}, {1, 4}, {2, 3}, {2, 4}, {1, 2, 3}, {1, 2, 4}, {1, 3, 4}, {2, 3, 4}, and {1, 2, 3, 4}. Alternatively, the second field may indicate only some SRS resource combinations, for example, indicates only an SRS resource combination in which a quantity of SRS resources in the $1^{st}$ included SRS resource set is equal to a quantity of SRS resources in the $2^{nd}$ included SRS resource set, for example, {1, 3}, {1, 4}, {2, 3}, {2, 4}, or {1, 2, 3, 4}. Alternatively, the second field may indicate only an SRS resource combination in which a quantity of SRS resources does not exceed a specific threshold. For example, when the specific threshold is 2, the second field may indicate the SRS resource combination {1, 3}, {1, 4}, {2, 3}, or {2, 4}. Alternatively, the second field may indicate an SRS resource combination in which a quantity of SRS resources in the $1^{st}$ included SRS resource set is equal to a quantity of SRS resources in the $2^{nd}$ included SRS resource set and in which a quantity of SRS resources does not exceed a specific threshold. The specific threshold may be the maximum rank value that can be used for PUSCH transmission, a total quantity of SRSs in a configured/activated SRS resource set whose usage is a non-codebook, or the smaller one of the two. Alternatively, the specific threshold may be specified in a protocol (where for example, it is specified that the specific threshold is equal to 4), indicated by the network device, or reported by the terminal device.

Case 3: Some field values of the second field indicate a single SRS resource combination, and the other field values indicate N SRS resource combinations. For example, two SRS resource sets {1, 2} and {3, 4} whose usage is a non-codebook are configured/activated. The SRS resource combination indicated by the second field may be any one of {1}, {2}, {3}, {4}, {1, 2}, {3, 4}, {1, 3}, {1, 4}, {2, 3}, {2, 4}, {1, 2, 3}, {1, 2, 4}, {1, 3, 4}, {2, 3, 4}, or {1, 2, 3, 4}. When a field value indicates N SRS resource combinations (that is, indicated SRS resources include resources in N SRS resource sets or SRS resource subsets), it may be limited that quantities of SRS resources in the N indicated resource combinations are equal, that is, the SRS resource combinations indicated by the field value belong to the N SRS resource sets or SRS resource subsets, and quantities of SRS resources that belong to the SRS resource sets or the SRS resource subsets are equal. For example, the SRS resource combinations such as {1, 3}, {1, 4}, {2, 3}, {2, 4}, and {1, 2, 3, 4} belong to the SRS resource sets {1, 2} and {3, 4}, and quantities of SRS resources that belong to SRS resource sets or SRS resource subsets are the same, for example, are all 1 or 2. Alternatively, when a field value indicates N SRS resource combinations (that is, indicated SRS resources include resources in N SRS resource sets or SRS resource subsets), it may be limited that a quantity of SRS resources included in each of the N SRS resource combinations indicated by the field value does not exceed a first threshold. The first threshold may be a maximum quantity of transport layers corresponding to each beam/spatial relation/antenna panel/TCI-state/UL TCI-state, an upper limit of a quantity of SRS resources in a configured/activated SRS resource set whose usage is a non-codebook, or the smaller one of the two. Alternatively, the first threshold may be specified in a protocol (where for example, it is specified that the first threshold is equal to 2 or 4), indicated by the network device, or reported by the terminal device. Alternatively, when a field value indicates N SRS resource combinations (that is, indicated SRS resources include resources in N SRS resource sets or SRS resource subsets), it may be limited that a total quantity of SRS resources included in the N resource combinations indicated by the field value does not exceed a second threshold. The second threshold may be a maximum quantity of transport layers supported by uplink transmission (for example, a maximum quantity of layers for uplink transmission that is configured by the network device), an upper limit of a quantity of SRS resources in all configured/activated SRS resource sets whose usage is a non-codebook, or the smaller one of the two. Alternatively, when a field value indicates N SRS resource combinations (that is, indicated SRS resources include resources in N SRS resource sets or SRS resource subsets), it may be limited that a quantity of SRS resources included in each of the N SRS resource combinations indicated by the field value is equal and the quantity of SRS resources included in each of the SRS resource combinations does not exceed a first threshold, or limited that a quantity of SRS resources included in each of the N SRS resource combinations indicated by the field value is equal and a total quantity of SRS resources included in the SRS resource combinations does not exceed a second threshold. Alternatively, the second threshold may be specified in a protocol (where for example, it is specified that the second threshold is equal to 2 or 4), indicated by the network device, or reported by the terminal device.

A length of the second field is equal to $\lceil \log_2 X \rceil$, where X is a quantity of all SRS resource combinations that can be indicated. Specially, when X=1, the length of the field may be 0.

In the foregoing embodiment, a method for indicating the N SRS resource combinations by using the second information may be mandatory in a protocol, or may be optional in a protocol. For example, the network device may configure, by using RRC signaling, whether to support/use the method for indicating the N SRS resource combinations by using the second information; or the terminal device may report, through a terminal capability reporting process, whether to support/use the method for indicating the N SRS resource combinations by using the second information. For example, the terminal device may report that the terminal device supports performing PUSCH transmission by using N beams/N SRS resources/N spatial relations/N TCI-states/N pieces of QCL information/N SRS resource combinations, that is, the terminal device supports/uses the method for indicating the N SRS resource combinations by using the second information. Further, a specific manner in which the second information indicates the N SRS resource combinations may be configured by using the RRC signaling, and may be any one of the foregoing manners in which the second information indicates the N SRS resource combinations. For example, the N SRS resource combinations are indicated by using a plurality of subfields of the second field, or the second field may directly indicate the N SRS resource combinations. Alternatively, a specific manner in which the second information indicates the N SRS resource combinations may be reported through the terminal capability reporting process, and may be any one of the foregoing manners in which the second information indicates the N SRS resource combinations.

In addition, the terminal device may determine a function of the second information based on a condition 2, that is, determine, based on the condition 2, whether the second information indicates a single SRS resource combination or a plurality of (N) SRS resource combinations. If the condition 2 is met, the terminal device determines that the second information is used to indicate the N SRS resource combinations. Otherwise, the terminal device determines that the second information is used to indicate a single SRS resource combination.

For example, if the condition 2 is met, the terminal device determines that a field (the second field, for example, the SRI field) in the DCI includes N subfields, and each subfield is used to indicate one SRS resource combination, so that the N SRS resource combinations can be determined. Otherwise, the terminal device determines that the second field includes only one subfield (that is, a length of only one subfield (for example, the $1^{st}$ subfield) is not 0), so that only one SRS resource combination can be determined. Alternatively, if the condition 2 is met, the terminal device determines that the DCI includes N fields, and each field is used to indicate one SRS resource combination, so that the N SRS resource combinations can be determined. Otherwise, the terminal device determines that only one field in the DCI is used to indicate one SRS resource combination (that is, a length of only one field (for example, the $1^{st}$ field) is not 0), so that only one SRS resource combination can be determined. Alternatively, if the condition 2 is met, the terminal device determines that the second field in the DCI is used to indicate the N SRS resource combinations. Otherwise, the terminal device determines that the second field in the DCI is used to indicate only one SRS resource combination, so that only one SRS resource combination can be determined.

The condition 2 may include one or more of the following: The network device configures/activates a plurality of SRS resource sets whose usage is a non-codebook; the network device configures/activates one SRS resource set whose usage is a non-codebook, where SRS resources in the SRS resource set are divided into a plurality of SRS resource subsets; the network device configures/activates a plurality of CSI-RS resources associated with an SRS resource set whose usage is a non-codebook; the network device explicitly or implicitly indicates to perform PUSCH transmission by using the plurality of SRS resource combinations, for example, indicates, by using a field (for example, a first bit of the SRS resource indicator field, or a new data indicator field) in the DCI, to perform PUSCH transmission by using the plurality of SRS resource combinations; and the network device configures, by using RRC signaling, a PUSCH transmission mode as repeated PUSCH transmission based on a plurality of beams/a plurality of SRS resources/a plurality of spatial relations/a plurality of TCI-states/a plurality of pieces of QCL information. For example, PUSCHs are simultaneously transmitted by using a plurality of beams/a plurality of SRS resources/a plurality of spatial relations/a plurality of TCI-states/a plurality of pieces of QCL information, or PUSCHs are separately transmitted at a plurality of different time points by using a plurality of beams/a plurality of SRS resources/a plurality of spatial relations/a plurality of TCI-states/a plurality of pieces of QCL information.

In a possible design, a dedicated field may be used to indicate or enable the function of the second information, to be specific, indicate whether the second information indicates a single SRS resource combination or a plurality of (N) SRS resource combinations. The dedicated field may include Z bits, where Z is an integer greater than or equal to 1. The dedicated field may be an independent field, or may be the first Z bits, the middle Z bits, or the last Z bits of a field (for example, the SRI field). This is not limited in this application.

A value of Z may be determined based on a quantity of configured/activated SRS resource sets whose usage is a non-codebook. For example, if the quantity of configured/activated SRS resource sets whose usage is a non-codebook is 1, Z=0; or if the quantity of configured/activated SRS resource sets whose usage is a non-codebook is 2, Z=1 or Z=2. Alternatively, the value of Z may be specified in a protocol. For example, it is specified that Z=1 or Z=2. Alternatively, the value of Z may be indicated by the network device, for example, indicated by using RRC signaling/MAC-CE signaling/DCI signaling. Alternatively, the value of Z may be reported through a terminal capability reporting process.

The Z bits may indicate one or more of the following information: a quantity N of SRS resource combinations indicated by the DCI (namely, the SRS resource combinations indicated by the second information); information indicating whether the quantity of SRS resource combinations indicated by the DCI is greater than 1; information indicating whether the quantity of SRS resource combinations indicated by the DCI is equal to a quantity of configured SRS resource sets; and an SRS resource set/an SRS resource subset corresponding to the SRS resource combination indicated by DCI, for example, a quantity of SRS resource sets/SRS resource subsets corresponding to the SRS resource combination indicated by the DCI, or a number of the SRS resource set/SRS resource subset corresponding to the SRS resource combination indicated by the DCI. For example, it is assumed that there are two SRS resource sets/SRS resource subsets in total, and the Z bits include 1 bit. When Z=0, the $1^{st}$ SRS resource set/SRS resource subset is indicated. When Z=1, numbers of the two SRS resource sets/SRS resource subsets are indicated.

The terminal device may determine, based on the SRS resource set/SRS resource subset indicated by the Z bits, the SRS resource combination indicated by the DCI. For example, it is assumed that two SRS resource sets (an SRS resource set 0 and an SRS resource set 1) whose usage is a non-codebook are configured/activated in total. If it is determined, based on the Z bits, that the SRS resource combination indicated by the DCI corresponds to the SRS resource set 0, N SRS resource combinations may be determined from the SRS resource set 0. If if it is determined, based on the Z bits, that the SRS resource combination indicated by the DCI corresponds to the SRS resource set 1, N SRS resource combinations may be determined from the SRS resource set 1. If it is determined, based on the Z bits, that the SRS resource combination indicated by the DCI corresponds to the SRS resource set 0 and the SRS resource set 1, N SRS resource combinations may be determined from the SRS resource set 0 and the SRS resource set 1.

The foregoing SRS resource indication method for data transmission may be used for uplink transmission, downlink transmission, or sidelink transmission. Optionally, uplink transmission may be performed on a common uplink, or may be performed on a supplementary uplink. Optionally, uplink transmission may be DCI scheduling based uplink transmission, or may be semi-persistent uplink transmission or scheduling-free uplink transmission.

The foregoing method may be used to indicate an SRS resource combination, and may be further used to indicate another reference signal, provided that an SRS resource combination is replaced with another reference signal, and an SRS resource set is replaced with the another reference signal set. The another reference signal may be a CSI-RS, a CRS, an SSB, a PTRS, a TRS, a DMRS, or the like.

706: The terminal device performs data transmission based on the N SRS resource combinations.

The terminal device performs data transmission based on the N SRS resource combinations indicated by the second information and based on beams/spatial relations/TCI-states and codebooks corresponding to the N SRS resource combinations. Optionally, PUSCH transmission may be simultaneously performed by using the beams/spatial relations/TCI-states and the codebooks corresponding to the N SRS resource combinations, or transmission may be separately performed at different time points by using the beams/spatial relations/TCI-states and the codebooks corresponding to the N SRS resource combinations.

In a possible design, the terminal device may transmit different uplink data by using the N SRS resource combinations, for example, transmit different transport blocks (TBs), or transmit different RVs of a same TB.

In another possible design, the terminal device may repeatedly transmit uplink data by using the N SRS resource combinations, for example, transmit a same TB or a same RV of a same TB.

The terminal device performs a plurality of PUSCH transmissions. The plurality of PUSCH transmissions may correspond to a same RV or different RVs corresponding to a same TB or codeword, or correspond to different data streams corresponding to a same TB or codeword, or correspond to different TBs or codewords.

The plurality of PUSCH transmissions may be performed on a same time domain resource and different frequency domain resources. In other words, the plurality of PUSCH transmissions correspond to a same time domain resource and different frequency domain resources. The plurality of PUSCH transmissions may alternatively be performed on a same frequency domain resource and different time domain resources. In other words, the plurality of PUSCH transmissions correspond to a same frequency domain resource and different time domain resources. The plurality of PUSCH transmissions may alternatively be performed on a same time-frequency resource and different spatial domain resources (for example, antenna ports). In other words, the plurality of PUSCH transmissions correspond to a same time-frequency resource and different spatial domain resources. The plurality of PUSCH transmissions may alternatively be performed on different time domain resources and different frequency domain resources. In other words, the plurality of PUSCH transmissions correspond to different time domain resources and different frequency domain resources.

The plurality of PUSCH transmissions may correspond to a plurality of different groups of SRS resources (namely, a plurality of different SRS resource combinations), and each group of SRS resources includes one or more SRS resources. The terminal device performs transmission based on each corresponding group of SRS resources, for example, performs transmission by using a transmit beam and a precoding matrix that correspond to one corresponding group of SRS resources. A quantity of SRS resource combinations may be equal to a quantity of PUSCH transmissions. In this case, the plurality of PUSCH transmissions are in one-to-one correspondence with a plurality of groups of SRS resources. For example, according to an indicated sequence of the plurality of groups of SRS resources, an $i^{th}$ group of SRS resources corresponds to an $i^{th}$ transmission. Alternatively, according to a sequence of indexes of SRS resource sets corresponding to the plurality of groups of SRS resources, a group of SRS resources for which an index of an SRS resource set is the $i^{th}$ largest or the $i^{th}$ smallest corresponds to an $i^{th}$ transmission. Alternatively, a quantity of groups of SRS resources may be less than a quantity of PUSCH transmissions. In this case, cyclic mapping may be performed according to the foregoing sequence. To be specific, when all the groups of SRS resources are traversed according to the foregoing sequence, mapping is performed again starting from the $1^{st}$ group of SRS resources. For example, assuming that eight transmissions need to be performed, and two groups of SRS resources {1, 2} are indicated, groups of SRS resources corresponding to the eight transmissions may be respectively 1, 2, 1, 2, 1, 2, 1, and 2. The plurality of groups of SRS resources may alternatively correspond to different frequency domain/time domain/spatial domain/time-frequency resources. In other words, each group of SRS resources corresponds to one group of frequency domain/time domain/spatial domain/time-frequency resources. A specific correspondence may use the foregoing correspondence between an SRS resource and PUSCH transmission, provided that the $i^{th}$ transmission is replaced with an $i^{th}$ group of time domain resources/frequency domain resources/spatial domain resources/time-frequency resources. The $i^{th}$ group of time domain resources/frequency domain resources/spatial domain resources/time-frequency resources may be a time domain resource/frequency domain resource/spatial domain resource/time-frequency resource corresponding to the $i^{th}$ transmission.

For the foregoing PUSCH transmission mode, the terminal device may report, through the terminal capability reporting process, whether to support the PUSCH transmission mode. Alternatively, the terminal device may report, through the terminal capability reporting process, a PUSCH transmission mode specifically supported by the terminal device.

In this embodiment of this application, the network device may indicate the plurality of SRS resource combinations to the terminal device by using the second information, that is, a quantity of SRS resource combinations that can be indicated by the network device is extended, so that the terminal device can perform multi-beam based uplink transmission based on the plurality of SRS resource combinations indicated by the second information.

Each of N SRS resource combinations may have an equal quantity of SRS resources. In this way, the terminal device may determine, based on a quantity of SRS resources in one of the SRS resource combinations, a quantity of SRS resources in a remaining SRS resource combination, thereby reducing signaling overheads for indicating the quantity of SRS resources in the remaining SRS resource combination.

In the foregoing embodiments provided in this application, the method provided in embodiments of this application is described from perspectives of the terminal device, the network device, and interaction between the terminal device and the network device. Optionally, in the foregoing embodiments provided in this application, network devices may interact with each other and the terminal device may interact with the network device. To implement the functions in the method provided in embodiments of this application, the terminal device and the network device each may include a hardware structure and/or a software module, to implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 8:
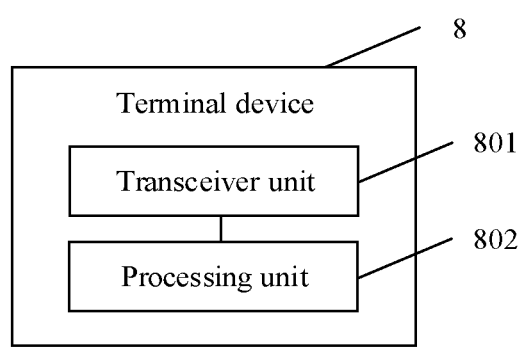
FIG. 8 is a schematic structural diagram of another terminal device according to an embodiment of this application.

When each functional module is obtained through division based on each corresponding function, FIG. 8 is a schematic diagram of a possible structure of an apparatus 8 in the foregoing embodiments. The apparatus may be a terminal device, and the terminal device includes a transceiver unit 801 and a processing unit 802. In this embodiment of this application, the transceiver unit 801 is configured to receive first information, where the first information is used to indicate a plurality of codebooks; and the processing unit 802 is configured to perform data transmission based on the plurality of codebooks, where each of the plurality of codebooks corresponds to one beam. Alternatively, the transceiver unit 801 is configured to receive second information, where the second information is used to indicate N SRS resource combinations, where N is an integer greater than 1; and the processing unit 802 is configured to perform data transmission based on the N SRS resource combinations, where each of the N SRS resource combinations corresponds to one beam.

The transceiver unit 801 may be the communication interface 404 in FIG. 4, and the processing unit 802 may be the processor 401 and/or the processor 407 in FIG. 4.

In the method embodiment shown in FIG. 6 or FIG. 7, the transceiver unit 801 is configured to support the terminal device in performing the processes 602 and 604 in FIG. 6 and the processes 703 and 705 in FIG. 7; and the processing unit 802 is configured to support the terminal device in performing the process 605 in FIG. 6 and the process 706 in FIG. 7. All related content of the steps in the foregoing method embodiments may be cited in function descriptions of corresponding functional modules. Details are not described herein again.

Figure 9:
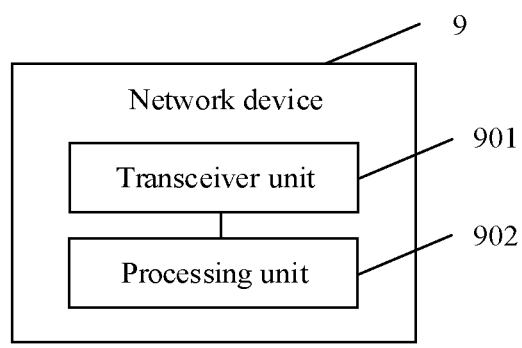
FIG. 9 is a schematic structural diagram of another network device according to an embodiment of this application.

When each functional module is obtained through division based on each corresponding function, FIG. 9 is a schematic diagram of a possible structure of an apparatus 9 in the foregoing embodiments. The apparatus may be a network device, and the network device includes a transceiver unit 901 and a processing unit 902. In this embodiment of this application, the transceiver unit 901 is configured to send first information, where the first information is used to indicate a plurality of codebooks; and the processing unit 902 is configured to perform data transmission based on the plurality of codebooks, where each of the plurality of codebooks corresponds to one beam. Alternatively, the transceiver unit 901 is configured to send second information, where the second information is used to indicate N SRS resource combinations, where N is an integer greater than 1; and the processing unit 902 is configured to perform data transmission based on the N SRS resource combinations, where each of the N SRS resource combinations corresponds to one beam.

The transceiver unit 901 may be the communication interface 504 in FIG. 5, and the processing unit 902 may be the processor 501 and/or the processor 505 in FIG. 5.

In the method embodiment shown in FIG. 6 or FIG. 7, the transceiver unit 901 is configured to support the terminal device in performing the processes 601 and 603 in FIG. 6, and the processes 701, 702, and 704 in FIG. 7. All related content of the steps in the foregoing method embodiments may be cited in function descriptions of corresponding functional modules. Details are not described herein again.

For example, the terminal device or the network device in the foregoing apparatus embodiments may completely correspond to the terminal device or the network device in the method embodiments, and a corresponding module or unit performs a corresponding step. For example, a communication module (a transceiver) may perform a sending step and/or a receiving step in the method embodiments, and other steps than the sending step and the receiving step may be performed by a processing unit (a processor). For a function of a specific unit, refer to a corresponding method embodiment. A sending unit and a receiving unit may form a transceiver unit, and a transmitter and a receiver may form a transceiver, to jointly implement sending and receiving functions. There may be one or more processors.

For example, functions of the terminal device or the network device may be implemented by using a chip, and the processing unit may be implemented by using hardware or software. When the processing unit is implemented by using the hardware, the processing unit may be a logic circuit, an integrated circuit, or the like. When the processing unit is implemented by using the software, the processing unit may be a general-purpose processor, and is implemented by reading software code stored in a storage unit. The storage unit may be integrated into the processor, or may be located outside the processor and exist independently.

The terminal device or the network device in the foregoing apparatus embodiments may completely correspond to the terminal device or the network device in the method embodiments, and a corresponding module or unit performs a corresponding step. For example, a sending module (a transmitter) performs a sending step in the method embodiments, a receiving module (a receiver) performs a receiving step in the method embodiments, and other steps than the sending step and the receiving step may be performed by a processing module (a processor). For a function of a specific module, refer to the corresponding method embodiment. The sending module and the receiving module may form a transceiver module, and the transmitter and the receiver may form a transceiver, to jointly implement sending and receiving functions. There may be one or more processors.

Module or unit division in embodiments of this application is an example, is merely logical function division, and may be other division during actual implementations. In addition, functional modules in embodiments of this application may be integrated into one processor, may exist alone physically, or two or more modules may be integrated into one module. The integrated module may be implemented in a form of hardware, or may be implemented in a form of a software functional module. For example, in embodiments of this application, the receiving unit and the sending unit may be integrated into the transceiver unit.

All or some of the methods in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedures or functions according to embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

Clearly, a person skilled in the art can make various modifications and variations to embodiments of this application without departing from the scope of this application. In this way, this application is intended to cover these modifications and variations of embodiments of this application provided that they fall within the scope of the claims of this application and their equivalent technologies.

What is claimed is:

1. A data transmission method, comprising:
    receiving, by a terminal device, first information indicating a plurality of codebooks; and
    performing, by the terminal device, data transmission based on the plurality of codebooks, wherein each of the plurality of codebooks corresponds to one beam.

2. The data transmission method according to claim 1, wherein
    the plurality of codebooks have a same quantity of layers.

3. The data transmission method according to claim 1, wherein
    the plurality of codebooks comprise a first codebook and a second codebook, the first codebook is determined from a first codebook set, the second codebook is determined from a second codebook set, and the second codebook set is a subset of the first codebook set.

4. The data transmission method according to claim 1, wherein the first information is carried in a plurality of subfields of a first field, and each subfield is used to indicate one codebook.

5. The data transmission method according to claim 4, wherein
a codebook indicated by a $1^{st}$ subfield in the plurality of subfields is determined from a first codebook set based on a value of the $1^{st}$ subfield, and the first codebook set comprises a plurality of codebooks.

6. The data transmission method according to claim 5, wherein
a codebook indicated by an $i^{th}$ subfield in the plurality of subfields is determined from the second codebook set based on a value of the $i^{th}$ subfield, and the second codebook set is a subset of the first codebook set, wherein i is an integer greater than or equal to 2.

7. The data transmission method according to claim 6, wherein
a length of the $i^{th}$ subfield is determined based on a quantity of codebooks comprised in the second codebook set.

8. The data transmission method according to claim 6, wherein
the second codebook set comprises a codebook whose quantity of codebook layers is Q in the first codebook set, wherein Q is a quantity of layers of the codebook indicated by the $1^{st}$ subfield in the plurality of subfields, and Q is an integer greater than or equal to 1.

9. A data transmission method, comprising:
sending, by a network device, first information indicating a plurality of codebooks; and
performing, by the network device, data transmission based on the plurality of codebooks, wherein each of the plurality of codebooks corresponds to one beam.

10. The data transmission method according to claim 9, wherein
the plurality of codebooks have a same quantity of layers.

11. The data transmission method according to claim 9, wherein
the plurality of codebooks comprise a first codebook and a second codebook, the first codebook is determined from a first codebook set, the second codebook is determined from a second codebook set, and the second codebook set is a subset of the first codebook set.

12. The data transmission method according to claim 9, wherein the first information is carried in a plurality of subfields of a first field, and each subfield is used to indicate one codebook.

13. The data transmission method according to claim 12, wherein
a codebook indicated by a $1^{st}$ subfield in the plurality of subfields is determined from a first codebook set based on a value of the $1^{st}$ subfield, and the first codebook set comprises a plurality of codebooks.

14. An apparatus, comprising:
a receiver, configured to receive first information indicating a plurality of codebooks; and
a processor, configured to perform data transmission based on the plurality of codebooks, wherein each of the plurality of codebooks corresponds to one beam.

15. The apparatus according to claim 14, wherein
the plurality of codebooks have a same quantity of layers.

16. The apparatus according to claim 14, wherein
the plurality of codebooks comprise a first codebook and a second codebook, the first codebook is determined from a first codebook set, the second codebook is determined from a second codebook set, and the second codebook set is a subset of the first codebook set.

17. The apparatus according to claim 14, wherein the first information is carried in a plurality of subfields of a first field, and each subfield is used to indicate one codebook.

18. The apparatus according to claim 17, wherein
a codebook indicated by a $1^{st}$ subfield in the plurality of subfields is determined from a first codebook set based on a value of the $1^{st}$ subfield, and the first codebook set comprises a plurality of codebooks.

19. The apparatus according to claim 18, wherein
a codebook indicated by an $i^{th}$ subfield in the plurality of subfields is determined from the second codebook set based on a value of the $i^{th}$ subfield, and the second codebook set is a subset of the first codebook set, wherein i is an integer greater than or equal to 2.

20. The apparatus according to claim 19, wherein
a length of the $i^{th}$ subfield is determined based on a quantity of codebooks comprised in the second codebook set.

* * * * *